(12) United States Patent
Ikarashi et al.

(10) Patent No.: US 12,257,896 B2
(45) Date of Patent: Mar. 25, 2025

(54) TRAVELING OPERATION DEVICE OF CRAWLER-TYPE AERIAL WORK PLATFORM

(71) Applicant: HOKUETSU INDUSTRIES CO., LTD., Niigata (JP)

(72) Inventors: Norihide Ikarashi, Niigata (JP); Isao Masuda, Niigata (JP); Masaki Hiwatashi, Niigata (JP)

(73) Assignee: HOKUETSU INDUSTRIES CO., LTD., Niigata (JP)

( * ) Notice: Subject to any disclaimer, the term of this patent is extended or adjusted under 35 U.S.C. 154(b) by 841 days.

(21) Appl. No.: 17/495,742

(22) Filed: Oct. 6, 2021

(65) Prior Publication Data

US 2023/0107313 A1 Apr. 6, 2023

(51) Int. Cl.
| | |
|---|---|
| *B60K 26/02* | (2006.01) |
| *B60K 1/02* | (2006.01) |
| *B62D 11/04* | (2006.01) |
| *B62D 55/065* | (2006.01) |
| *B66F 11/04* | (2006.01) |

(52) U.S. Cl.
CPC .............. *B60K 26/02* (2013.01); *B60K 1/02* (2013.01); *B62D 11/04* (2013.01); *B62D 55/065* (2013.01); *B66F 11/042* (2013.01); *B60K 2026/029* (2013.01)

(58) Field of Classification Search
CPC .......... B60K 26/02; B60K 1/02; B62D 11/04; B62D 55/065
USPC ........................................................ 182/14
See application file for complete search history.

(56) References Cited

U.S. PATENT DOCUMENTS

| | | | | |
|---|---|---|---|---|
| 9,568,939 | B2* | 2/2017 | Guglielmo | G06F 3/016 |
| 2016/0179128 | A1* | 6/2016 | Guglielmo | G06F 3/016 |
| | | | | 182/19 |
| 2022/0289543 | A1* | 9/2022 | Ikarashi | B66F 11/042 |

FOREIGN PATENT DOCUMENTS

| | | | | |
|---|---|---|---|---|
| CN | 103707949 A | * | 4/2014 | ............ B62D 11/04 |
| CN | 110357008 A | * | 10/2019 | |
| JP | 2002167198 A | * | 6/2002 | |
| JP | 2010222087 A | * | 10/2010 | |

(Continued)

OTHER PUBLICATIONS

JP-2002167198-A (Ueki et al.) (Jun. 11, 2002) (Machine Translation) (Year: 2002).*

*Primary Examiner* — Mahmoud Gimie
(74) *Attorney, Agent, or Firm* — Ronald M. Kachmarik; Cooper Legal Group LLC

(57) ABSTRACT

A traveling operation device of a crawler-type aerial work platform including an operation of an enable switch by one hand is provided. An enable switch and a changeover switch are disposed on an operation rod main body at positions where the enable switch and the changeover switch are operable by fingers gripping the operation rod main body of an operation rod during traveling so that all of them are operable by one hand. When a controller receives a switching command signal in accordance with the operation of the changeover switch in a state of usual travel control according to tilt of the operation rod in front-rear and right-left directions, the controller stops the usual travel control to transition the usual travel control to spin turn control that rotates motors in mutually opposite directions and turns the platform on the spot.

8 Claims, 17 Drawing Sheets

(56) References Cited

FOREIGN PATENT DOCUMENTS

| JP | 6080458 B | 2/2017 | |
| WO | WO-2018055295 A1 * | 3/2018 | ............. B66C 13/40 |

* cited by examiner

ADVANCE WHILE TURNING
(IN ANTICLOCKWISE DIRECTION)

ADVANCE WHILE TURNING
(PIVOT TURN IN
ANTICLOCKWISE DIRECTION)

RETREAT WHILE TURNING
(IN CLOCKWISE DIRECTION)

RETREAT WHILE TURNING
(PIVOT TURN
IN CLOCKWISE DIRECTION)

RETREAT WHILE TURNING
(IN CLOCKWISE DIRECTION)

RETREAT WHILE TURNING
(PIVOT TURN
IN CLOCKWISE DIRECTION)

ADVANCE WHILE TURNING
(IN ANTICLOCKWISE DIRECTION)

ADVANCE WHILE TURNING
(PIVOT TURN IN
ANTICLOCKWISE DIRECTION)

SPIN TURN
(IN ANTICLOCKWISE
DIRECTION)

SPIN TURN
(IN CLOCKWISE
DIRECTION)

TRAVELING OPERATION DEVICE OF CRAWLER-TYPE AERIAL WORK PLATFORM

FIELD OF THE INVENTION

The present invention relates to a traveling operation device of crawler-type aerial work platform, and in detail relates to a traveling operation device that causes a aerial work platform to perform a travel operation, such as advance, retreat, turn, and stop, according to an operation by an operator who rides on a deck in a caterpillar self-propelled aerial work platform. The crawler self-propelled aerial work platform includes the deck on which the operator rides on above an undercarriage including crawlers as traveling devices and motors to drive the crawlers and an elevating mechanism to cause the deck to move up and down above the undercarriage.

BACKGROUND OF THE INVENTION

As illustrated in FIG. 15, a crawler-type aerial work platform 100 includes a deck 104 and an elevating mechanism (a scissors link mechanism in the illustrated example) 103. The deck 104 is moved up and down while an operator or the like rides on an undercarriage 102, which includes crawlers 105 (105a, 105b) as traveling devices. The elevating mechanism 103 is to move up and down the deck 104 above the undercarriage 102. A pair of motors (not illustrated) that independently drive the respective crawlers 105a, 105b disposed at the left and the right of the undercarriage 102 are mounted on the undercarriage 102, and thus self-propelling is possible.

The crawler-type aerial work platform 100 includes a control panel 110 installed on the deck 104 and a traveling operation device configured of a controller as an electronic control device that controls an operation of the pair of motors described above according to an operation of a lever and a switch disposed on the control panel. The operator who rides on the deck 104 operates the lever, the switch, and the like disposed on the control panel 110 to advance, retreat, turn, or stop the aerial work platform 100 to ensure driving.

FIG. 15 and FIG. 16 illustrate an exemplary configuration of the control panel 110 employed in the traveling operation device of the crawler-type aerial work platform 100.

The control panel 110 illustrated in FIG. 15 and FIG. 16 individually includes a left side traveling lever 125a that operates the left side crawler 105a and a right side traveling lever 125b that operates the right side crawler 105b, respectively. Both of the left side traveling lever 125a and the right side traveling lever 125b are configured as uniaxial levers tiltable only in one axis direction of back and forth. Thus, the controller (not illustrated) controls rotation directions and rotation speeds of the respective motors for the left side and right side crawlers according to tilt directions and tilt angles of the left side traveling lever 125a and the right side traveling lever 125b.

In FIG. 15, reference numeral 122 denotes a foot switch type enable switch. While the enable switch 122 is depressed, the operations of the left side and right side traveling levers 125a, 125b are enabled. Thus, for example, even when a part of a body of the operator contacts the traveling levers 125a, 125b or the like disposed on the control panel 110 when the operator stops the aerial work platform 100 and performs a work on the deck, malfunction, such as start of traveling of the aerial work platform 100, is avoided.

As illustrated in FIG. 17, as the control panel 110 of the crawler-type aerial work platform 100, the following traveling operation device has been proposed (see FIG. 3 in Japanese Patent No. 6080458). A travel operation lever 125 capable of tilt operation only in one axis direction of back and forth is disposed. By tilting the travel operation lever 125 from a neutral position in a front-rear direction, a travel operation to advance the aerial work platform 100 by the forward tilt, to retreat the aerial work platform 100 by the backward tilt, and to stop the aerial work platform 100 at the neutral position is performed. A turning amount operation dial 126 as a rotary switch is disposed. Rotation of the turning amount operation dial 126 from the neutral position to the right or left direction allows operating a turning direction and an amount of turning of the aerial work platform 100 according to the rotation direction and the amount of rotation.

RELATED ART DOCUMENTS

Patent Document

[Patent Document 1] Japanese Patent No. 6080458

SUMMARY OF THE INVENTION

Problems to be Solved by the Invention

In the traveling operation device described above, two or more devices, the left side traveling lever 125a and the right side traveling lever 125b, which have been described with reference to FIG. 15 and FIG. 16, the travel operation lever 125 and the turning amount operation dial 126, which are in the configuration described with reference to FIG. 17, need to be operated for the travel operation. Therefore, both hands are full during the travel operation, and the operator cannot support the body by, for example, holding on to a safety barrier 140.

Especially, as described with reference to FIG. 15, in the configuration of disposing the foot switch type enable switch 122, the operator performs the travel operation in an unstable posture of standing on the deck 104 in a state of a one leg stand in which the operator depresses the enable switch 122 by one foot. The posture in which both hands are full and the operator cannot hold on to the safety barrier 140 or the like is further risky, such as falling.

Moreover, recently, due to a request for efficiency of high-place work, it has been requested that the aerial work platform 100 can be traveled with the deck 104 moved up. The operator feels a fear for the travel operation in a state where both hands are full and therefore the body cannot be supported, and also the state is dangerous.

However, in the crawler-type aerial work platform 100 that performs specific turning operations, such as a turning operation performed with one of the right and left crawlers stopped (the turning operation will be referred to as "pivot turn" in this specification) and a turning operation performed by reversely rotating the left side and right side crawlers (the turning operation will be referred to as "spin turn" in this specification), a traveling operation device configured to perform all travel operations including the specific turning operations and the operation of the enable switch 122 by one hand does not conventionally exist. As a result, feeling of a fear of the operator and danger, such as falling, during the travel operation cannot be dispelled.

In the aerial work platform 100, the above-described control panel 110 is generally installed in a state of being fixed to, for example, the safety barrier 140 of the deck 104. However, by configuring this so as to be removably attachable and can be carried to outside the deck 104, according to working conditions, the control panel 110 can also be used as a remote controller (a remote control) for remote operation of the aerial work platform 100.

Thus, when the control panel 110 can also be used as the remote control, even when the operator does not ride on the deck 104, the aerial work platform 100 can be traveled. For example, in a usual use state, the control panel 110 is installed to, for example, the safety barrier 140 of the deck 104 for use. In a case where driving while a person is onboard is risky, such as traveling when the aerial work platform 100 is loaded onto or unloaded from a vehicle carrier car, such as a self loader and a safety loader, and traveling when loading or unloading is performed on a loading platform of a motor truck using a loading ramp (an on-board slope), or the similar case, or in a case where the aerial work platform 100 is caused to pass through a location difficult to pass through (a height is low) while the operator rides on the deck, such as an entrance of an elevator when the aerial work platform 100 is loaded on the elevator and carried for use for a building work, without the riding of the operator on the deck 104, the control panel 110 is removed and used as the remote control, thus ensuring operating a drive operating device disposed in the control panel 110 outside the deck 104 for traveling.

However, the existing control panel 110 has a comparatively large box shape, and even an adult male need to carry the control panel 110 with holding the control panel 110 in an arm. To ensure using the control panel 110 as the remote control, including the operation of the enable switch and transition to a travel state specific to the crawler-type aerial work platform 100, such as the pivot turn and the spin turn, it is necessary to ensure performing general travel operations of the crawler-type aerial work platform 100 by one hand and by comparatively simple operations.

Therefore, the present invention has been made to solve the drawbacks in the related art, and an object of the present invention is to provide a traveling operation device of crawler-type aerial work platform configured to perform, in addition to travel operations, such as advance, retreat, turn (including pivot turn and spin turn), and stop of a aerial work platform, all travel operations including an operation of an enable switch by one hand and by comparatively simple operations.

Means for Solving the Problem

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above object, a traveling operation device 10 of self-propelled crawler-type aerial work platform 1, comprises:
a left side crawler 5a and a right side crawler 5b as traveling devices;
an undercarriage 2 including a left side motor 60a and a right side motor 60b, the left side motor 60a and the right side motor 60b independently driving the left side crawler 5a and the right side crawler 5b, respectively; and
a deck 4 configured to move up and down above the undercarriage 2, wherein
the traveling operation device 10 includes:
a control panel 11 disposed on the deck 4;
an operation rod 20 disposed on the control panel 11; and
a controller 70 that controls rotations of the left side motor 60a and the right side motor 60b according to an operation of the operation rod 20,
the operation rod 20 includes:
an operation rod main body 21 capable of tilt operation from a neutral position in a front-rear direction and a right-left direction; and
an enable switch 22 that enables the control of the left side and the right side motors 60a and 60b by the controller 70 based on the operation of the operation rod 20 only while the enable switch is pressed,
the enable switch 22 is disposed on the operation rod main body 21 at a position where the tilt is operable on the operation rod main body 21 while the enable switch is pressed with fingers same as fingers gripping the operation rod main body 21,
the controller 70:
performs usual travel control when a switching command signal is not received from the operation rod 20; and
stops the usual travel control when the switching command signal is received to transition to spin turn control,
in the usual travel control:
when the tilt operation is performed on the operation rod main body 21 only in the front-rear direction without the tilt operation in the right-left direction, the left side motor 60a and the right side motor 60b are caused to rotate at a basic rotation speed preset as a rotation direction and a rotation speed common to the left side motor 60a and the right side motor 60b corresponding to respective positions of neutral, front inclination, and rear inclination of the operation rod main body 21; and
when the tilt operation is performed on the operation rod main body 21 in the right-left direction while the tilt operation is performed on the operation rod main body 21 in the front-rear direction, the rotation speeds of the left side motor 60a and the right side motor 60b are corrected such that the aerial work platform 1 performs a turning operation in a direction corresponding to the tilt operation in the right-left direction of the operation rod main body 21, and
in the spin turn control, the left side motor 60a and the right side motor 60b are caused to rotate in mutually opposite directions.

Here, the left turn means a travel state in which the rotation speed of the left side motor 60a is slow (including stop) relative to the rotation speed of the right side motor 60b that rotates in a traveling direction designated by the tilt in the front-rear direction of the operation rod main body 21. The right turn means a travel state in which the rotation speed of the right side motor 60b is slow (including stop) relative to the rotation speed of the left side motor 60a that rotates in the traveling direction designated by the tilt in the front-rear direction of the operation rod main body 21.

The operation rod 20 may include a changeover switch 24 at a position where the changeover switch 24 is simultaneously operable with the enable switch 22 by the fingers same as the fingers gripping the operation rod main body 21 while the operation rod main body 21 is gripped and the operation is performed, and the changeover switch 24 generates the switching command signal.

The changeover switch 24 may employ, for example, a three-position switch having the neutral position, a first position, and a second position, a first switching command signal is generated at the first position as the switching command signal, and a second switching command signal is generated at the second position as the switching command signal, and the controller 70:
upon receiving the first switching command signal from the changeover switch 24, rotates the right side motor 60b at the basic rotation speed and the left side motor 60a at a rotation speed in a reverse rotation direction of the basic rotation speed; and
upon receiving the second switching command signal from the changeover switch 24, rotates the left side motor 60a at the basic rotation speed and the right side motor 60b at a rotation speed in the reverse rotation direction of the basic rotation speed.

In stead of the above configuration, a detection signal that detects a tilt in the right-left direction of the operation rod main body 21 by a predetermined angle (for example, 15°) or more with respect to the neutral position by right/left tilt angle detector (the second tilt angle detection sensor 28b) configured to detect a tilt angle in the right-left direction of the operation rod main body 21 is treated as the switching command signal.

In such case, the controller 70:may rotates the right side motor 60b at the basic rotation speed and the left side motor 60a at a rotation speed in a reverse rotation direction of the basic rotation speed when the detection signal from the right/left tilt angle detector (the second tilt angle detection sensor 28b) indicates that a left tilt angle of the operation rod main body 21 is the predetermined angle (for example, 15°) or more; and may rotates the left side motor 60a at the basic rotation speed and the right side motor 60b at a rotation speed in the reverse rotation direction of the basic rotation speed when the detection signal from the right/left tilt angle detector (the second tilt angle detection sensor 28b) indicates that a right tilt angle of the operation rod main body 21 is the predetermined angle (for example, 15°) or more.

In the usual travel control, the controller 70: may stop the rotation of the left side motor 60a when the operation rod main body 21 is at a maximum left tilt angle in the usual travel control; and may stop the rotation of the right side motor 60b (causing the aerial work platform 1 to perform the pivot turn) when the operation rod main body 21 is at a maximum right tilt angle in the usual travel control.

Effect of The Invention

The configuration of the present invention that has been described above has allowed to obtain the following remarkable effects from the aerial work platform 1 including the traveling operation device 10 of the present invention.

The operation rod 20 is disposed on the operation rod main body 21 and the enable switch 22 is disposed at the position where the enable switch 22 can be operated with fingers gripping the operation rod main body 21. Thus, the traveling operation device 10 that allows performing all travel operations of the crawler-type aerial work platform 1 including the operation of the enable switch, in addition to the operations of advance, retreat, turn including the pivot turn and the spin turn, and stop of the aerial work platform 1, by one hand can be provided.

Thus, since the driving operation of the aerial work platform 1 can be performed by one hand, an operator can drive the aerial work platform 1 in a state where a body is supported by, for example, holding on to a safety barrier 40 or the like by the empty hand. This has allowed reducing risk, such as falling on the deck 4.

Moreover, as described above, including the operation of the enable switch 22, since all travel operations of the aerial work platform 1 can be performed by one hand, as in the traveling operation device described with reference to FIG. 15, the operator need not operate the enable switch by foot. Since the travel operation can be performed in a posture of both feet on the deck, the operator can hold on to the safety barrier by one hand. By combination of them, falling risk on the deck can be further reduced.

Including the enable switch 22, since all travel operations can be performed by one hand, even when the control panel 11 is removed from the deck 4 and the operator performs an operation with the control panel 11 held in the arm, the operator can operate the operation rod 20 by one hand, and as a result, the control panel 11 of the present invention can be used also as a remote control used for traveling of the aerial work platform 1 by remote travel.

The changeover switch 24 that generates the switching command signal to instruct the controller 70 to transition to spin turn control is disposed on the operation rod main body 21 at the position where while the operator grips and operates the operation rod main body 21, the operator can operate the enable switch 22 simultaneously by the fingers same as the fingers gripping the operation rod main body 21. Accordingly, the transition operation from the usual travel control to the spin turn control can be easily performed by the operation of the changeover switch 24 by one hand.

Moreover, the switching from the usual travel control to the spin turn control can be performed by the operation of the changeover switch 24. Therefore, for example, without performing an operation of returning the operation rod main body 21 to the neutral position or the like, only the operation of the changeover switch 24 in a state where the operation rod main body 21 is at any appropriate tilt position allows transition to the spin turn control.

Especially, the changeover switch 24 is configured as, for example, a three-position switch that has the neutral position, the first position at which the first switching command signal is generated as the switching command signal, and a second position at which the second switching command signal is generated as the switching command signal, and the controller 70 changes the turning direction of the spin turn of the aerial work platform 1 between a case of receiving the first switching command signal and a case of receiving the second switching command signal. This allows causing the aerial work platform 1 to selectively perform the spin turn in an anticlockwise direction and a clockwise direction by the operation of the changeover switch 24.

In the configuration in which the detection signal that detects the tilt in the right-left direction of the operation rod main body 21 by the predetermined angle (for example, 15°) or more with respect to the neutral position by the right/left tilt angle detection means (herein after called "detector") (the second tilt angle detection sensor 28b) is treated as the above-described switching command signal, the simple operation, which is the tilt of the operation rod main body 21 by the predetermined angle (for example, 15°) or more, allows switching from the usual travel control to the spin turn control without disposing the changeover switch 24 on the operation rod 20. Thus, in addition to ensuring omitting the changeover switch 24 and reducing the number of components, the increase in the tilt angle in the right-left direction of the operation rod main body 21 allows naturally transitioning from the turn travel in the usual travel control to the spin turn.

In a configuration that when the operation rod main body 21 is at the maximum left tilt angle in the usual travel control, the controller 70 stops the rotation of the left side motor 60a, and when the operation rod main body 21 is at the maximum right tilt angle in the usual travel control, the controller 70 stops the rotation of the right side motor 60b, the operation of the operation rod main body 21 allows naturally changing the turn state of the aerial work platform 1 to the pivot turn.

EMBODIMENTS FOR CARRYING OUT THE INVENTION

The following will describe a configuration of the present invention with reference to the attached drawings.

[Overall Configuration of Aerial work platform]

Figure 1:
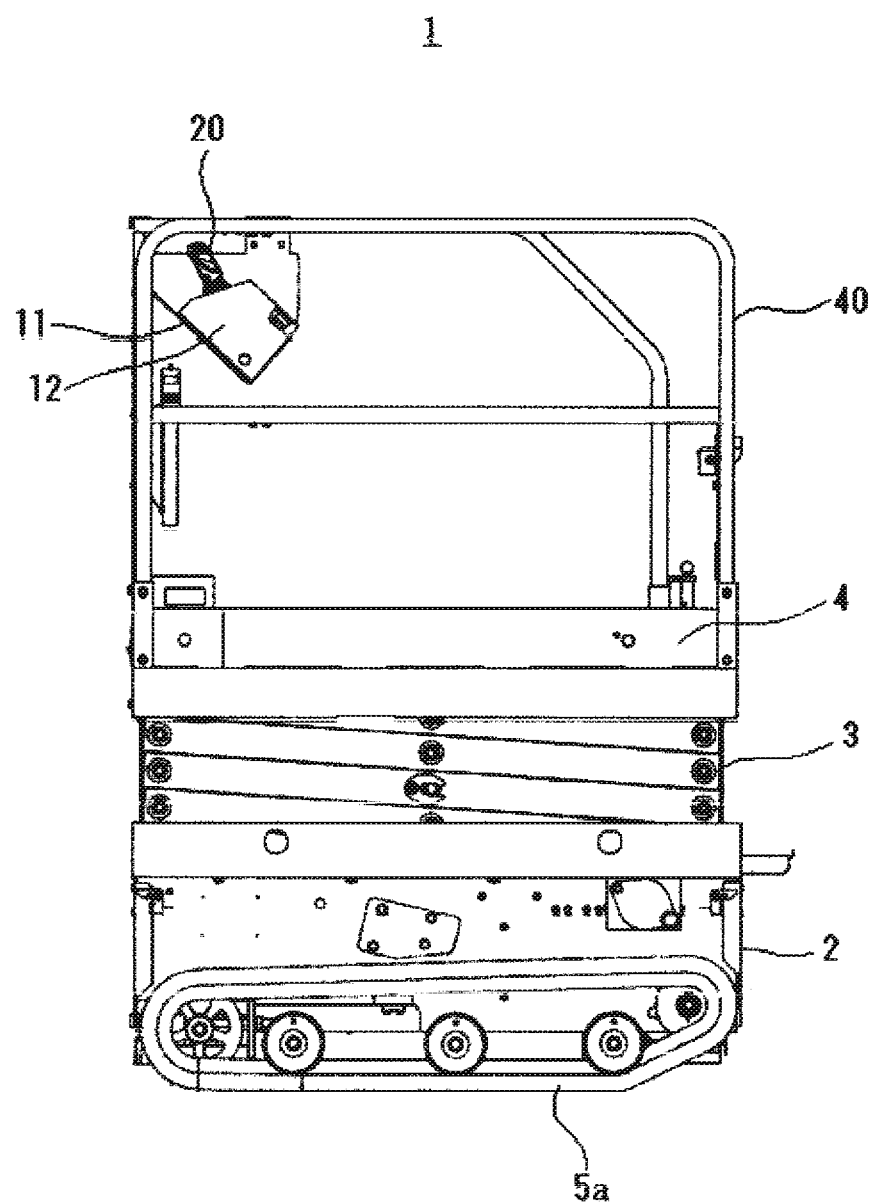
FIG. 1 is a side view of an aerial work platform that includes a traveling operation device of the present invention.
Figure 2:
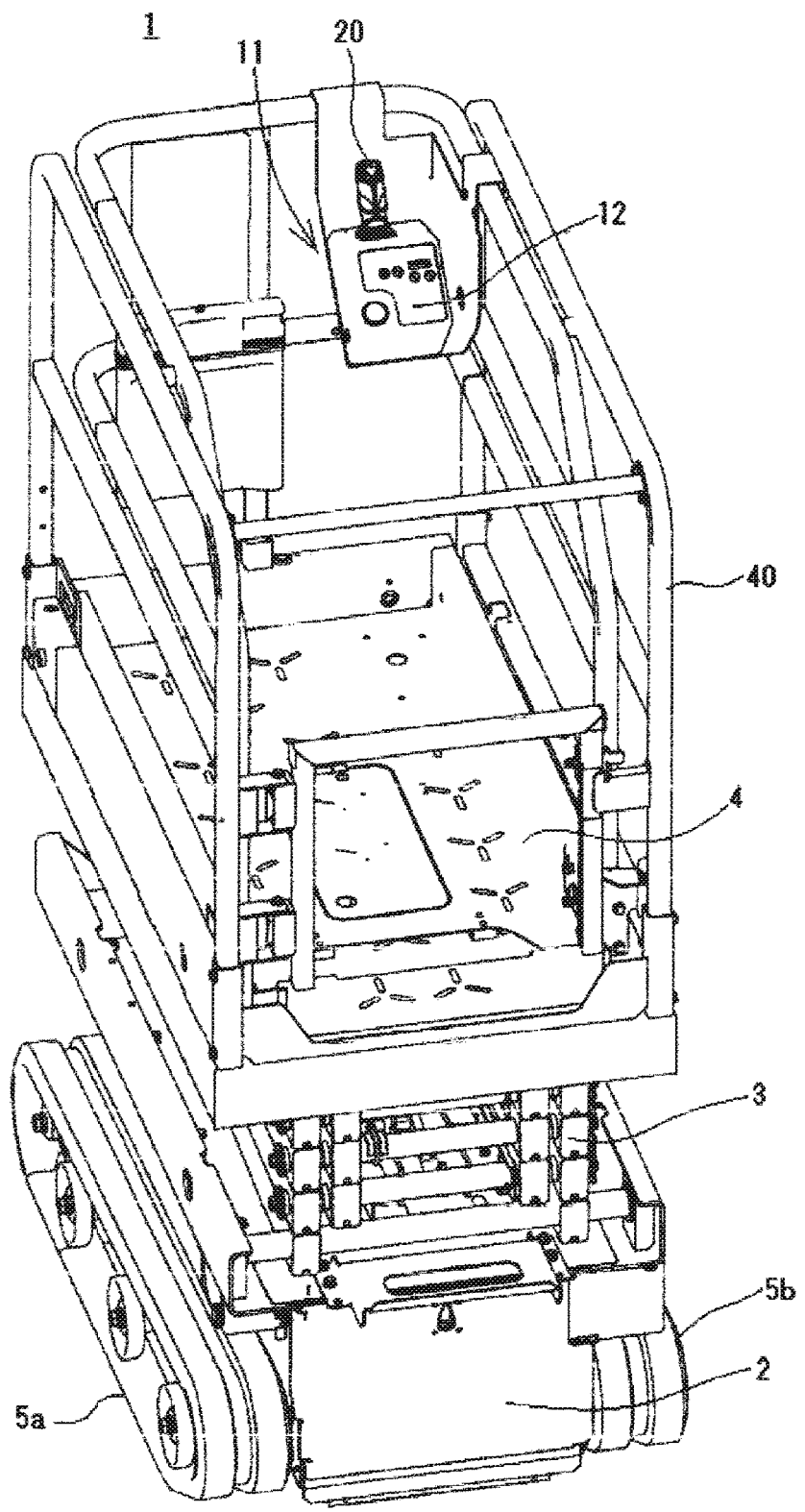
FIG. 2 is a perspective view of the aerial work platform including the traveling operation device of the present invention.

In FIG. 1 and FIG. 2, reference numeral 1 denotes a crawler-type aerial work platform that includes a traveling operation device 10 of the present invention. The aerial work platform 1 includes crawlers 5, an undercarriage 2, and a deck 4. The respective crawlers 5 (a left side crawler 5a and a right side crawler 5b) are traveling devices disposed on both sides in a width direction. The undercarriage 2 includes a left side motor 60a and a right side motor 60b (see FIG. 3) that drive the respective left side and right side crawlers 5a, 5b. The deck 4 above the undercarriage 2 moves up and down via an elevating mechanism 3 formed of a scissors link mechanism.

For example, by disposing a safety barrier 40 on the deck 4, falling of, for example, an operator and luggage ride on the deck 4 is reduced.

In the embodiment illustrated in the drawings, as one example of the aerial work platform 1 that includes the traveling operation device 10 of the present invention, the aerial work platform 1 having the structure configured to move up and down the deck by the elevating mechanism 3 formed of the scissors link mechanism has been described, however the aerial work platform 1 to which the traveling operation device 10 of the present invention is applied is applicable to the various kinds of known aerial work platforms including elevating mechanisms, such as the aerial work platform as described in Japanese Patent No. 6080458 (see FIG. 1 in Japanese Patent No. 6080458) described above in which a box-shaped deck is installed to a crane distal end of a crane truck to be movable up and down, and an aerial work platform (not illustrated) in which a deck can be moved up and down with a mast having a telescopic structure that is perpendicularly disposed upright on an undercarriage and vertically extends.

[Traveling Operation Device]

Figure 3:
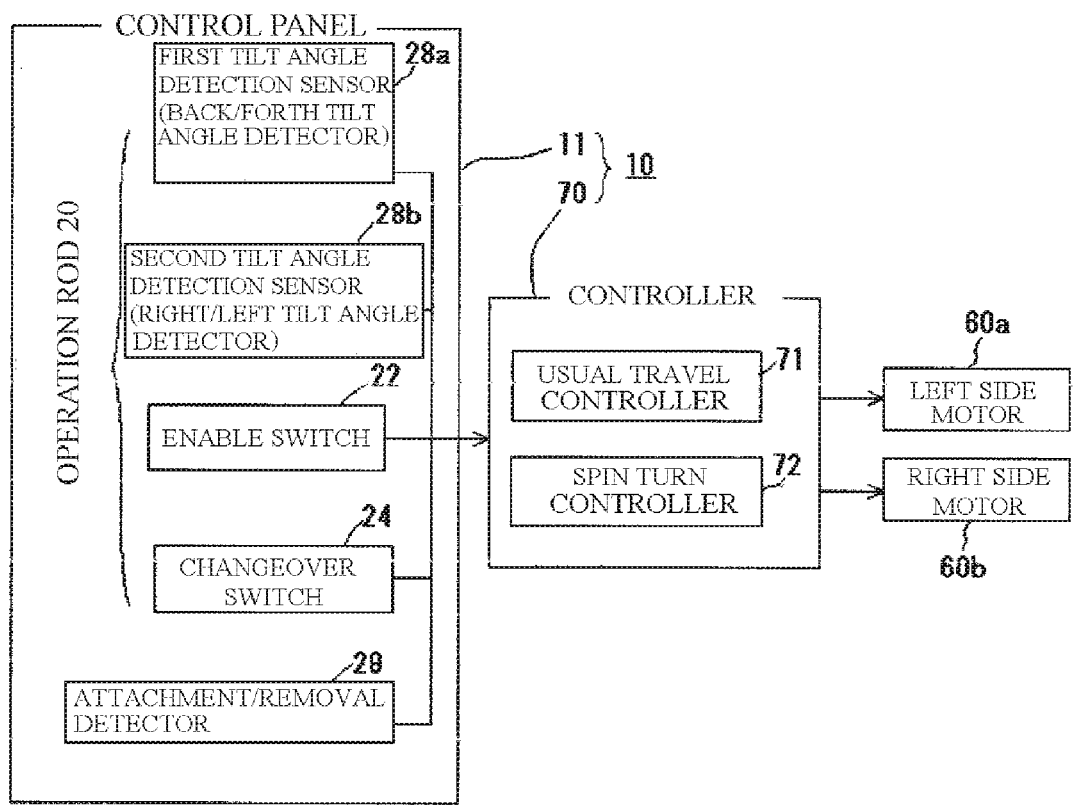
FIG. 3 is a function block diagram of the aerial work platform including the traveling operation device of the present invention.

As illustrated in FIG. 3, the traveling operation device 10 of the crawler-type aerial work platform 1 configured as described above includes a control panel 11 operated by the operator and a controller 70 that controls rotations of the left side motor 60*a* and the right side motor 60*b* according to the operation of an operation rod 20 disposed on the control panel 11.

[Control Panel]

(1) Overall Configuration

As illustrated in FIG. 1 and FIG. 2, the control panel 11 among them is disposed at a position, such as installation in the proximity of the upper end of the safety barrier 40 disposed on the deck 4 of the aerial work platform 1, where the operator who rides on the deck 4 can operate the control panel 11. Operating the operation rod 20 disposed on the control panel 11 allows performing respective operations of advance, retreat, turn, and stop of the aerial work platform 1.

As illustrated in FIG. 3, various kinds of operation commands input via the control panel 11 are input to the controller 70, which will be described later, configured of an electronic control device, such as a microcontroller. The controller 70 controls the rotations of the left side motor 60*a* and the right side motor 60*b* to ensure the travel operation (driving) of the aerial work platform 1 in accordance with the operation of the control panel 11 by the operator.

As illustrated in FIG. 4(A) to FIG. 4(C) and FIG. 5, the control panel 11 includes a control panel main body 12, the operation rod 20, and a bracket 30. The control panel main body 12 is formed by housing components in a casing 13. The operation rod 20 is disposed on the control panel main body 12 to perform the travel operation of the aerial work platform 1. With the bracket 30, the control panel main body 12 is installed to the safety barrier 40.

In the embodiment illustrated in the drawings, the control panel main body 12 includes only the above-described operation rod 20 and an emergency stop switch indicated by reference numeral 50 as a lever, a switch, and the like to operate the aerial work platform 1. However, the control panel main body 12 may further include a switch, a lever, and the like to cause the elevating mechanism 3 to perform the elevating operation of the deck 4. Alternatively, it may be configured that a selector switch to switch between the travel operation and the elevating operation may be disposed, and when the elevating operation is selected with the selector switch, the elevating operation of the deck can be performed by the operation of the operation rod 20.

(2) Operation Rod

The above-described operation rod 20 disposed on the control panel 11 includes an operation rod main body 21, an enable switch 22 (see FIG. 4B) installed to the operation rod main body 21, a first tilt angle detection sensor 28*a*, and a second tilt angle detection sensor 28*b* (see FIG. 3). The first tilt angle detection sensor 28*a* as back/forth tilt angle detector detects a tilt angle in a front-rear direction of the operation rod main body 21. The second tilt angle detection sensor 28*b* as right/left tilt angle detector detects a tilt angle in a right-left direction. In the embodiment illustrated in FIG. 3 to FIG. 5, a changeover switch 24 that outputs a switching command signal to instruct the controller 70 to switch a driving mode from usual travel control to spin turn control is further provided.

The operation rod main body 21 among them is configured swingably in both of the front-rear direction and the right-left direction starting from the neutral position. Based on detection signals from the above-described first and second tilt angle detection sensors 28*a*, 28*b* that have detected the tilt angles of the operation rod main body 21, during the usual travel control, the controller 70 can advance the aerial work platform 1 by tilting the operation rod main body 21 forward, retreat the aerial work platform 1 by tilting the operation rod main body 21 backward, and stop the aerial work platform 1 by returning the operation rod main body 21 to the neutral position. By tilting the operation rod main body 21 in the left direction and slowing the rotation speed of the left side motor 60*a* relative to the rotation speed of the right side motor 60*b*, the aerial work platform 1 can be turned to the left. Alternatively, by tilting the operation rod main body 21 in the right direction and slowing the rotation speed of the right side motor 60*b* relative to the rotation speed of the left side motor 60*a*, the aerial work platform 1 can be turned to the right.

In the operation rod main body 21, a grip rubber or the like is installed to a part gripped by the operator to form a grip portion 26 (see FIG. 4B, FIG. 4C, and FIG. 5), and the operator grips the grip portion 26 to perform the tilt operation on the operation rod main body 21.

As described above, the operation rod main body 21 includes the enable switch 22 and the changeover switch 24 in this embodiment. The enable switch 22 among them is configured of a momentary type switch. While the operator presses the enable switch 22, the rotation control of the left side and right side motors 60*a*, 60*b* by the controller 70 based on the operation of the operation rod 20 is enabled.

The above-described changeover switch 24 generates the switching command signal that instructs the switching of the control of the left side and right side motors 60*a*, 60*b* by the controller 70 from the usual travel control to the spin turn control.

Figure 5:
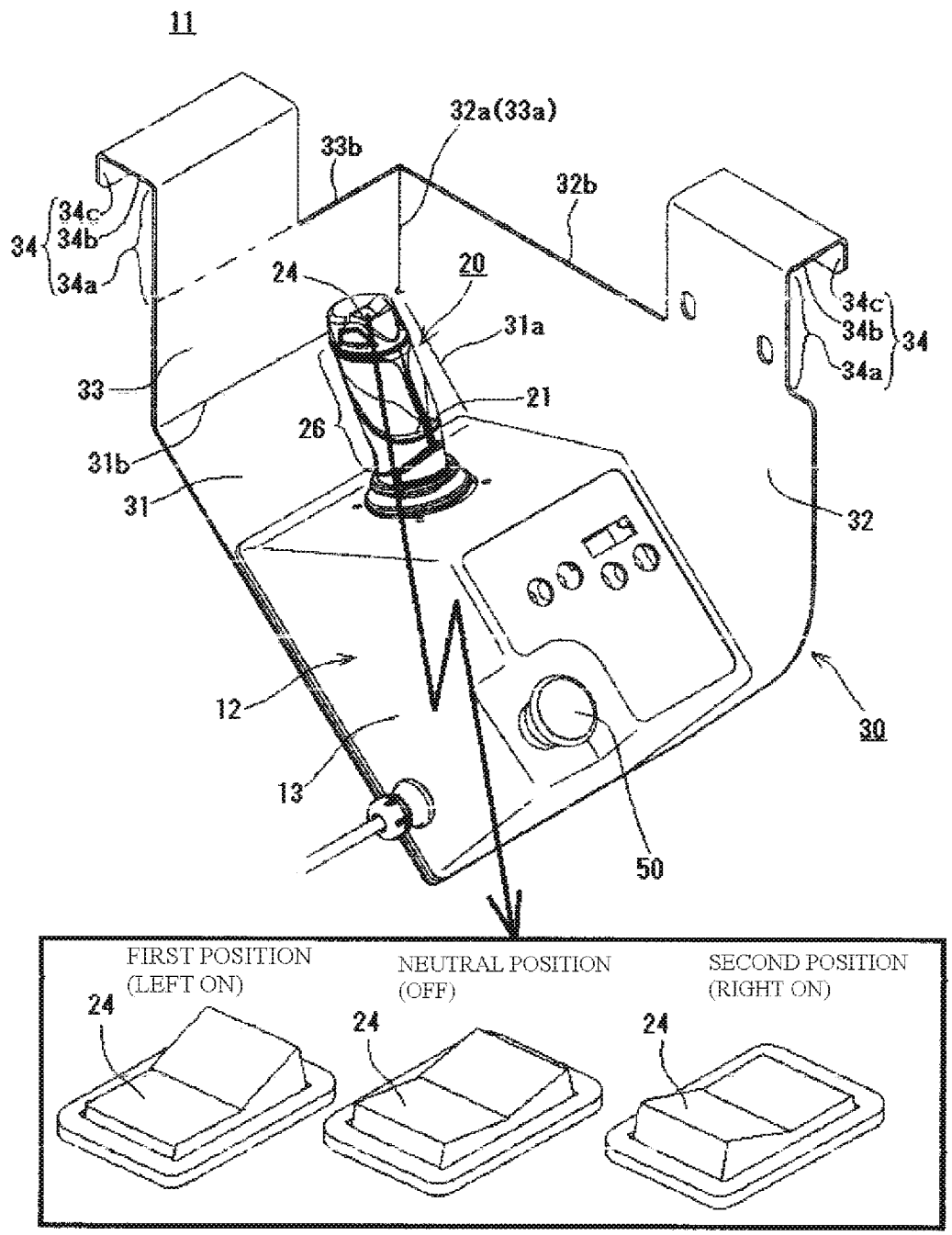
FIG. 5 is a perspective view of the control panel disposed in the traveling operation device of the present invention.

In this embodiment, as illustrated by the enlarged view in FIG. 5, the changeover switch 24 is configured of the three-position switch having the neutral position (OFF), the first position at which the first switching command signal is generated, and the second position at which the second switching command signal is generated. While the changeover switch 24 is at the neutral position, the controller 70 starts usual travel control means (herein after called "controller") 71 to perform the usual travel control. Meanwhile, while the changeover switch 24 at the first position or the second position, the controller 70 starts spin turn control means (herein after called "controller") 72 and performs the spin turn control by preset method depending on whether the changeover switch 24 is at any of the positions of the first position and the second position.

Both of the above-described enable switch 22 and changeover switch 24 are disposed at positions on the operation rod main body 21 where the enable switch 22 and the changeover switch 24 can be operated simultaneously by the same fingers gripping the grip portion 26 in the state of the operator gripping the grip portion 26 of the operation rod main body 21.

Figure 4A:
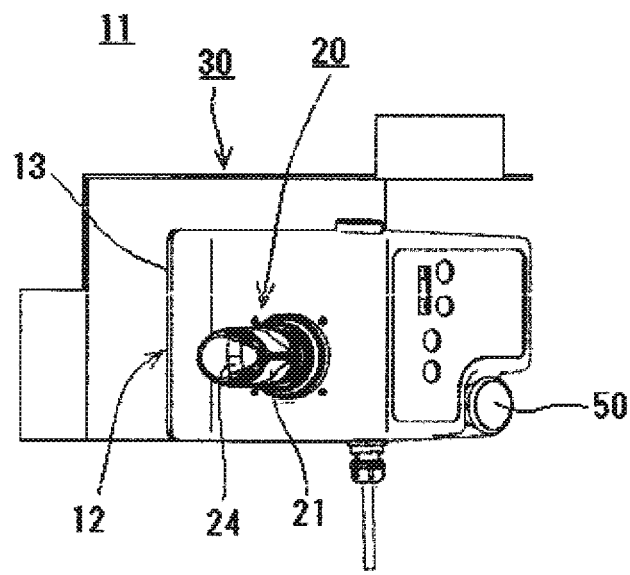
FIG. 4(A) 4A is a plan view of a control panel disposed in the traveling operation device of the present invention.
Figure 4B:
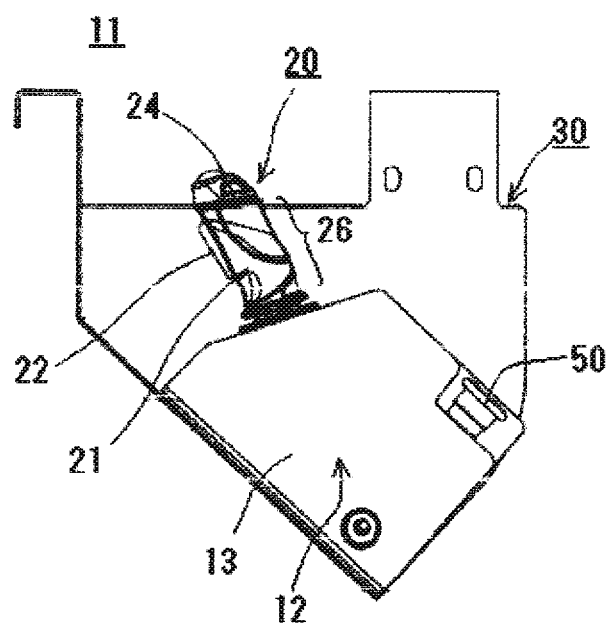
FIG. 4B is a left side view of a control panel disposed in the traveling operation device of the present invention.
Figure 4C:
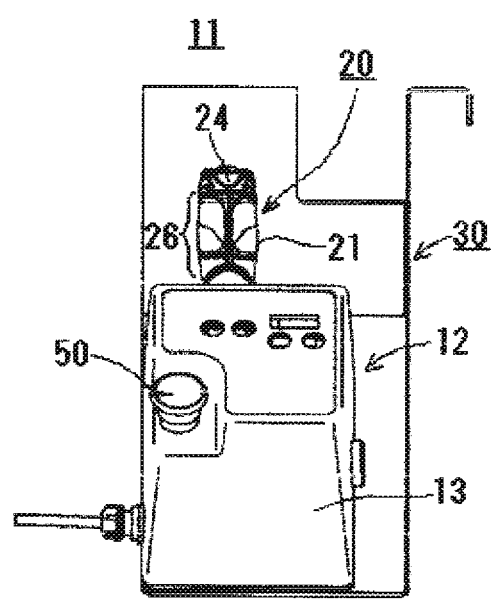
FIG. 4C is a back view of a control panel disposed in the traveling operation device of the present invention.

In this embodiment, as illustrated in FIG. 4B, the above-described enable switch 22 is disposed on a side surface on the front side of the grip portion 26 of the operation rod main body 21 as a trigger switch. By gripping the grip portion 26 with a ball of a finger on the enable switch 22, while the enable switch 22 is pressed, the operation rod main body 21 can be gripped and operated.

In this embodiment, as illustrated in FIG. 4(A) to FIG. 4(C) and FIG. 5, the above-described changeover switch 24 is disposed on a top surface of the grip portion 26 of the operation rod main body 21. In a state where the grip portion 26 is gripped and the enable switch 22 is pressed (gripped), the changeover switch 24 can be easily operated by a thumb.

In the embodiment illustrated in FIG. 4(A) to FIG. 4(C) and FIG. 5, the exemplary configuration in which the changeover switch 24 is disposed on the operation rod 20 and the operation of the changeover switch 24 allows switching the travel control performed by the controller 70 between the usual travel control and the spin turn control has been described. However, as will be described later as a modification example, in a case where the switching between the usual travel control and the spin turn control by the controller 70 is performed such that when the tilt angle in the right-left direction of the operation rod main body 21 becomes a predetermined angle (as one example, 15°) or more, the control is switched to the spin turn control, the above-described changeover switch 24 need not be disposed on the operation rod 20 and can be omitted.

(3) Control Panel Main Body

The above-described casing 13 of the control panel main body 12 houses various kinds of sensors, such as the above-described first tilt angle detection sensor 28a and second tilt angle detection sensor 28b, required to take out the travel operation of the aerial work platform 1 input by the operation of the operation rod 20 as an electric signal, an electronic control device, and the like.

In the above-described casing 13, biasing means (not illustrated) that biases the operation rod main body 21 to return the operation rod main body 21 to the neutral position is disposed. When the operation rod main body 21 is released from a state of being tilted in any of the front, rear, left, and right directions, the operation rod main body 21 automatically returns to the neutral position.

(4) Bracket

As the above-described bracket 30 to install the above-described control panel main body 12 to the safety barrier 40, in this embodiment, as illustrated in FIG. 5, a back surface plate 31 that forms an inclined surface on which the back surface of the control panel main body 12 is placed, a side surface plate 32 disposed upright in a perpendicular direction on one side 31a in the width direction of the back surface plate 31, and a front surface plate 33 disposed upright in a perpendicular direction on an upper end side 31b of the back surface plate 31 are provided. One side 33a in the width direction of the front surface plate 33 is orthogonally coupled to one side 32a in a height direction of the side surface plate 32.

In each of an upper end side 33b of the front surface plate 33 and an upper end side 32b of the side surface plate 32, a suspension metal fitting 34 formed of a suspension piece 34a that projects upward, a lock piece 34b that projects outward from an upper end of the suspension piece 34a in the horizontal direction, and a collar portion 34c that projects downward from the other end edge of the lock piece 34b are disposed. By inserting and fitting the upper end portion of the safety barrier 40 disposed upright on the deck 4 into the U-shaped parts opening downward surrounded by the upper end portions of the suspension pieces 34a, the lock pieces 34b, and the collar portions 34c of the suspension metal fittings 34, the control panel 11 can be installed in the proximity of the upper end of the safety barrier 40 in a suspended state.

In this embodiment, with the above-described suspension metal fittings 34, the control panel 11 can be installed to the corner portion of the safety barrier 40. By only hooking the two suspension metal fittings 34, 34 on the upper end portion of the safety barrier 40, without fixing, such as fastening with a bolt, the control panel 11 can be installed so as not to, for example, move the control panel 11 on the safety barrier 40, and by only lifting the control panel 11, the control panel 11 can be easily removed from the safety barrier 40.

In the embodiment illustrated in the drawing, the configuration in which the control panel main body 12 can be removed from the safety barrier 40 of the deck 4 integrally with the bracket 30 has been described. Instead of the configuration, for example, as a configuration in which the above-described bracket 30 is fixedly secured to the safety barrier 40 by a method, such as fastening with a bolt, and the control panel main body 12 is installed to the bracket 30 to be removably attachable, when the control panel main body 12 is removed from the safety barrier 40, any component of the control panel 11 including the bracket 30 and accessories disposed in the bracket 30 as a part of the control panel 11 (for example, attachment/removal detector 29 described later in a case of installation to the safety barrier 40 side) may remain on the safety barrier 40 side of the deck 4.

Note that the control panel 11 of the present invention can include the attachment/removal detector 29 (see FIG. 3) that detects the attachment/removal state of the control panel main body 12 to the safety barrier 40. As described above, in the embodiment illustrated in the drawing in which the bracket 30 is removed from the safety barrier 40 integrally with the control panel main body 12, the following configuration may be employed. As one example, a limit switch, a proximity sensor, or the like is disposed as the attachment/removal detector 29 on, for example, the above-described lock piece 34b of the suspension metal fitting 34 of the bracket 30. When the suspension metal fittings 34 are hooked on the upper end portion of the safety barrier 40, the attachment/removal detector 29 detect the presence of the upper end portion of the safety barrier 40, and the above-described attachment/removal detector 29 can detect that the control panel 11 is installed to the safety barrier 40 or is removed.

As long as the attachment/removal of the control panel 11 can be detected, the above-described attachment/removal detector 29 is not limited to the configuration of being disposed on the bracket 30 side and may be disposed on the safety barrier 40 side.

As described above, in the configuration in which the control panel main body 12 is removably attachable to the bracket 30, the attachment/removal detector 29 may be disposed on the control panel main body 12 side, or may remain on the safety barrier 40 side together with the bracket 30 when the attachment/removal detector 29 is disposed on the bracket 30 side and the control panel main body 12 is removed.

A detection signal that thus has detected the attachment/removal state of the control panel 11 to the safety barrier 40 is input to the controller 70, and when the control panel 11 is removed from the safety barrier 40 and used. The controller 70 may apply a predetermined decelerated travel speed to a travel speed applied when the control panel 11 installed to the safety barrier is used.

(5) Operation Method of Control Panel or the like

Figure 6:
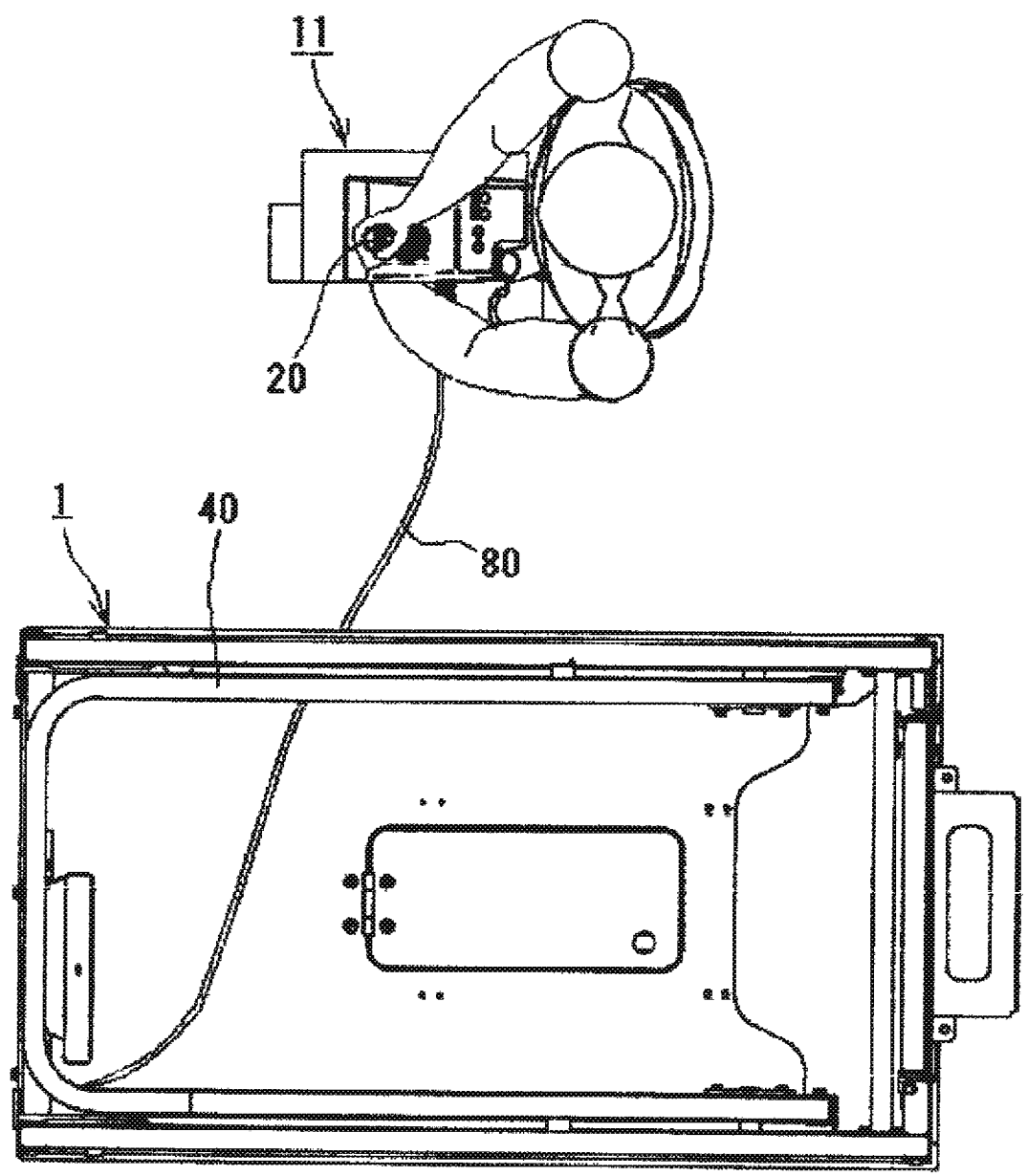
FIG. 6 is a plan view illustrating a use state with the control panel (a control panel main body) removed.

Not only that the control panel 11 disposed in the traveling operation device 10 of the present invention configured as described above is usable in the state of being installed to the safety barrier 40 of the deck 4 similarly to the known control panel, the control panel main body 12 can be removed from the safety barrier 40, carried to outside the deck 4, and used as a remote control for remote travel of the aerial work platform 1 (see FIG. 6).

In use according to any aspect, when the operator grips the grip portion 26 of the operation rod main body 21 such that the enable switch 22 disposed as the trigger switch contacts the ball of the finger, the enable switch 22 is pressed. In view of this, with the enable switch 22 pressed, both of the tilt of the operation rod main body 21 and the operation of the changeover switch 24 can be easily performed by one hand.

As a result, when the control panel main body 12 is used while being installed to the safety barrier 40, the operator can stand on the deck in the stable state with both feet on the deck. Moreover, the operator can hole on to the safety barrier by the other one empty hand, thus ensuring reducing, for example, falling on the deck.

As illustrated in FIG. 6, in a case where the control panel main body 12 is removed from the safety barrier 40 and used as the remote control, the operator performs the operation with the control panel main body 12 held in the arm. However, as described above, since the operation rod 20 disposed in the control panel main body 12 is designed such that the operator can easily operate by one hand, even when the control panel main body 12 is held in the arm, the travel operation of the aerial work platform 1 can be easily performed by one hand.

Thus, the control panel main body 12 can be removed from the safety barrier 40 and used as the remote control. Therefore, although in use for usual application, the control panel main body 12 is installed to the safety barrier 40 and the operator performs the driving as in conventional case. In a case where driving while a person is onboard is risky, such as traveling when the aerial work platform 1 is loaded onto or unloaded from a vehicle carrier car, such as a self loader and a safety loader, and traveling when loading or unloading is performed on a loading platform of a motor truck using a loading ramp (an on-board slope), or the similar case, or in a case where the aerial work platform 1 is caused to pass through a location difficult to pass through (a height is low) while the operator rides on the deck 4, such as an entrance of an elevator when the aerial work platform 1 is loaded on the elevator and carried for use for a building work, without the riding of the operator on the deck 4, the operation rod 20 disposed on the control panel main body 12 can be operated outside the deck 4 for traveling.

[Controller]

(1) Overall Configuration

The traveling operation device 10 of the crawler-type aerial work platform 1 of the present invention includes, in addition to the above-described control panel 11, as illustrated in FIG. 3, the controller 70 configured of an electronic control device, such as a microcontroller. The controller 70 receives the tilt angle of the operation rod main body 21 detected by the first and second tilt angle detection sensors 28*a*, 28*b* disposed in the control panel 11 and the switching command signal from the changeover switch 24 and controls the rotation of the left side motor 60*a* and the right side motor 60*b* in accordance with a preliminarily stored correspondence relationship.

Note that in the embodiment illustrated in FIG. 3, the controller 70 is illustrated as a component different from the above-described control panel 11, however the controller 70 may be housed in the above-described casing 13 of the control panel 11 together with the first and second tilt angle detection sensors 28*a*, 28*b* and the like as one of the components in the control panel 11.

When the switching command signal in accordance with the operation of the above-described changeover switch 24 is not received from control panel 11, the controller 70 starts the usual travel controller 71 through execution of a preliminarily stored program, and performs the usual travel control that causes the aerial work platform 1 to perform the usual travel control, such as advance, retreat, turn (including the pivot turn), and stop corresponding to the tilt operation of the operation rod main body 21. When the switching command signal is received, the controller 70 stops the usual travel control, starts the spin turn controller 72, and starts the spin turn control that causes the aerial work platform 1 to perform the spin turn.

When the switching command signal from the control panel 11 stops by the further operation (OFF operation) of the changeover switch 24, the controller 70 terminates the above-described spin turn control and returns to the above-described usual travel control.

(2) Usual Travel Controller

The usual travel controller 71 is means that starts when the controller 70 does not receive the switching command signal from the control panel 11 in accordance with the operation of the changeover switch 24.

By the start of the usual travel controller 71, the controller 70 rotates the left side motor 60*a* and the right side motor 60*b* at the rotation speed obtained by correcting a basic rotation speed, which is the rotation direction and the rotation speed common to the left side motor 60*a* and the right side motor 60*b* determined by the tilt angle in the front-rear direction of the operation rod main body 21 detected by the first tilt angle detection sensor 28*a* with a correction value determined by the tilt angle in the right-left direction of the operation rod main body 21 detected by the second tilt angle detection sensor 28*b* to perform the usual travel control that causes the aerial work platform 1 to advance, retreat, turn (including the pivot turn), and stop.

Here, the "basic rotation speed" is the common rotation direction and rotation speed that should be employed by the left side motor 60*a* and the right side motor 60*b* in a state in which the tilt operation in the right-left direction is not performed on the operation rod main body 21. Therefore, when the operator does not tilt the operation rod main body 21 in the right-left direction however performs the tilt operation only in the front-rear direction, the usual travel controller 71 in the controller 70 applies the basic rotation speed to both of the left side motor 60*a* and the right side motor 60*b* according to the tilt position in the front-rear direction of the operation rod main body 21.

Figure 7:
FIG. 7 is an explanatory view illustrating an example of a basic rotation speed.

In this embodiment, the rotation speed of the left side and right side motors 60*a*, 60*b* in the direction of causing the aerial work platform 1 to advance is indicated as positive (+), and the rotation speed in the retreat direction is indicated as negative (−). As one example, the operation rod main body 21 is configured to be tilted in the front inclination direction by 20° and in the rear inclination direction by 20° from the neutral position within a range of 40° in total, and as illustrated in FIG. 7, the rotation speed is set to linearly increase corresponding to the increase in the tilt angle from the basic rotation speed 0 (stop) at the neutral position to a basic rotation speed "rmax" (in FIG. 7) at the front inclination of 20°, or to a basic rotation speed "rmax" (in FIG. 7) at the rear inclination of 20°.

With the correction value determined by the tilt angle in the right-left direction of the operation rod main body 21, the basic rotation speed is corrected such that the increase in the tilt angle in the right-left direction increases a speed difference between the rotation speed of the left side motor 60*a* and the rotation speed of the right side motor 60*b*.

In this embodiment, the correction value is defined by percentage (%) to the basic rotation speed. For example, the correction value 50% indicates the rotation speed ½ of the basic rotation speed, 100% indicates the rotation speed identical to the basic rotation speed (no correction), 0% indicates the rotation speed zero (stop), and −100% indicates the rotation at the same rotation speed as and in the opposite direction to the basic rotation speed (hereinafter, the same is applied).

Figure 8:
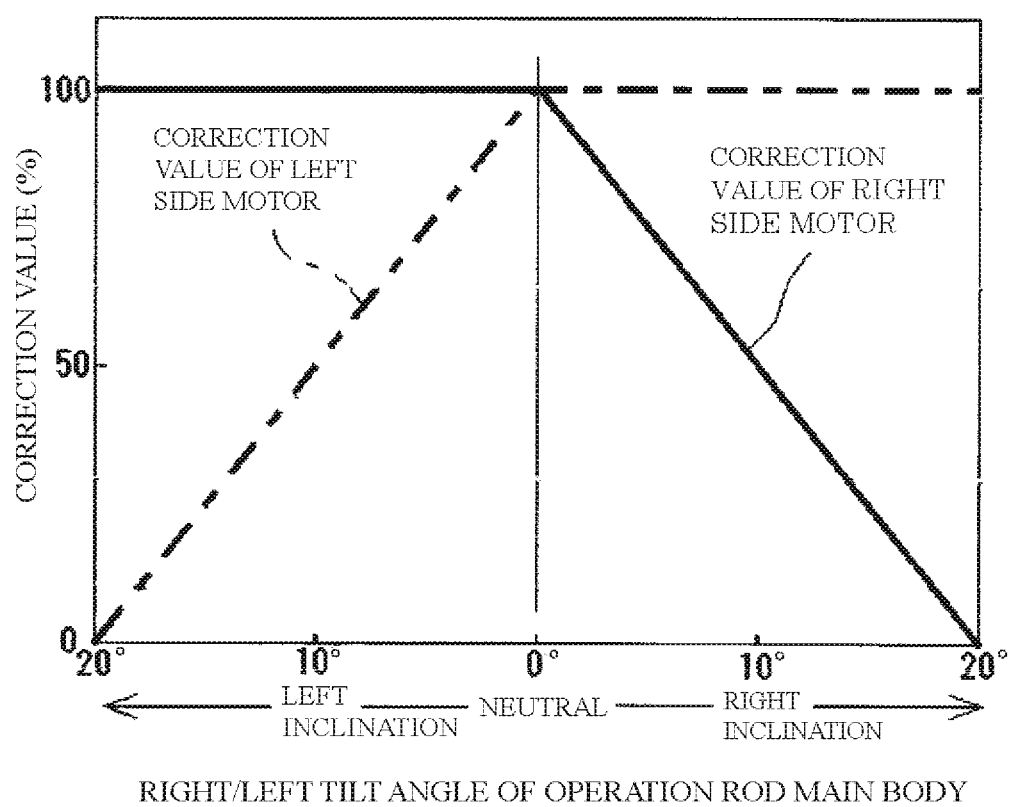
FIG. 8 is an explanatory view illustrating an example of a correction value.

In this embodiment, as one example, the operation rod main body 21 can be tilted by 20° in the left inclination direction and by 20° in the right inclination direction from the neutral position, and in the range of 40° in total. As illustrated in FIG. 8, when the operation rod main body 21 is tilted to the left side, with the rotation speed of the right side motor 60*b* maintained at 100% of the above-described basic rotation speed, as the rotation speed of the left side motor 60*a*, the rotation speed obtained by correcting the basic rotation speed so as to decelerate from 100% to 0% in accordance with the increase in the tilt angle is applied.

In view of this, the rotation speed of the left side motor 60*a* is slowed relative to the rotation speed of the right side motor 60*b* to turn the aerial work platform 1 to the left, and in accordance with the increase in the tilt angle in the left direction of the operation rod main body 21, the aerial work platform 1 is changed so as to turn to the left in a further small space, and the rotation speed of the left side motor 60*a* is decelerated down to 0% of the basic rotation speed to stop by tilt at the maximum tilt angle (20°) in the left direction, thus ensuring causing the aerial work platform 1 to perform the pivot turn.

Figure 9A:
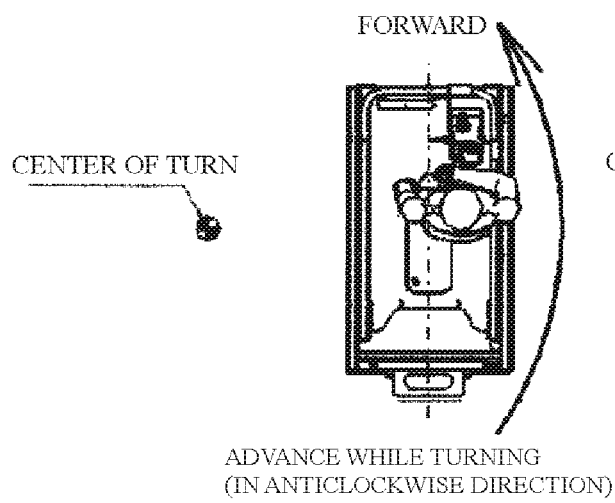
FIG. 9A is an explanatory view of turn travel (left turn) of the aerial work platform, illustrating advance while turning in an anticlockwise direction.
Figure 9B:
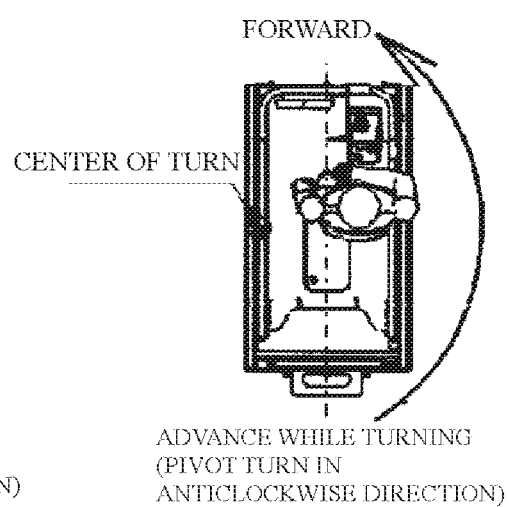
FIG. 9B is an explanatory view of turn travel (left turn) of the aerial work platform, illustrating advance while turning in an anticlockwise direction.

Therefore, with the operation rod main body 21 inclined forward, when the operation rod main body 21 is tilted in the left direction from the neutral position, the travel state transitions from the state (not illustrated) in which the aerial work platform 1 advances in the straight-ahead direction to the state of the advance while turning in the anticlockwise direction as illustrated in FIG. 9A, and when the tilt angle reaches the maximum tilt angle) (20° in the left direction, the travel state transitions to the pivot turn in the anticlockwise direction as illustrated in FIG. 9B.

Figure 9C:
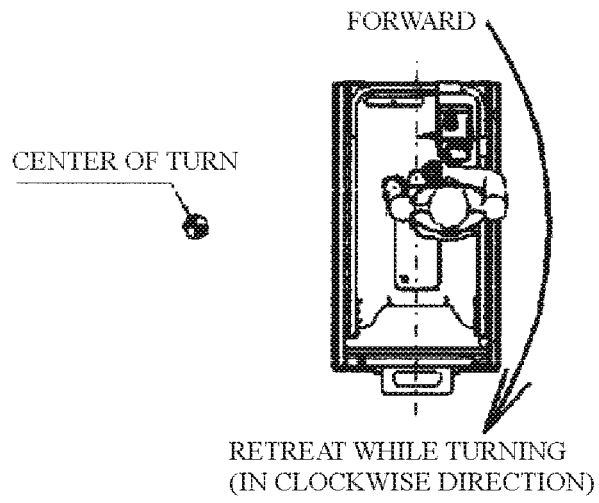
FIG. 9C is an explanatory view of turn travel (left turn) of the aerial work platform, illustrating retreat while turning in a clockwise direction.
Figure 9D:
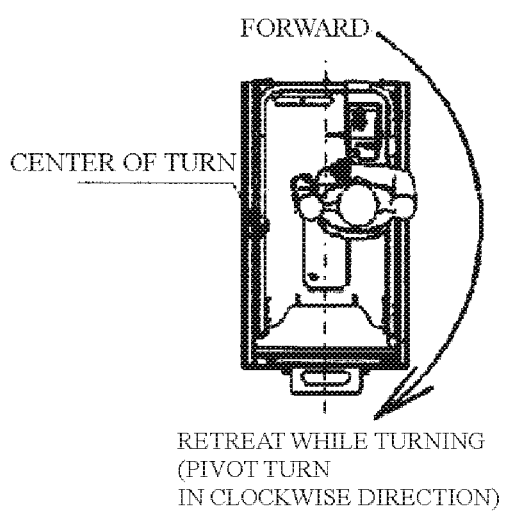
FIG. 9D is an explanatory view of turn travel (left turn) of the aerial work platform, illustrating retreat while turning in a clockwise direction.

With the operation rod main body 21 inclined backward, when the operation rod main body 21 is tilted in the left direction from the neutral position, the travel state transitions from the state (not illustrated) in which the aerial work platform 1 retreats in the straight-ahead direction to the state of the retreat while turning in the clockwise direction as illustrated in FIG. 9C, and when the tilt angle reaches the maximum tilt angle) (20° in the left direction, the travel state transitions to the pivot turn in the clockwise direction as illustrated in FIG. 9D.

In contrast to this, when the operation rod main body 21 is tilted to the right side, while the rotation speed of the left side motor 60*a* is maintained at 100% of the above-described basic rotation speed, as the rotation speed of the right side motor 60*b*, the rotation speed obtained by the correction so as to decelerate the basic rotation speed from 100% to 0% in accordance with the increase in the tilt angle is applied.

In view of this, the rotation speed of the right side motor 60*b* is slowed relative to the rotation speed of the left side motor 60*a* to turn the aerial work platform 1 to the right, and in accordance with the increase in the tilt angle in the right direction of the operation rod main body 21, the aerial work platform 1 is changed so as to turn in a further small space, and the rotation speed of the right side motor 60*b* is decelerated down to 0% of the basic rotation speed to stop by tilt at the maximum tilt angle (20°) in the right direction, thus ensuring causing the aerial work platform 1 to perform the pivot turn.

Figure 10A:
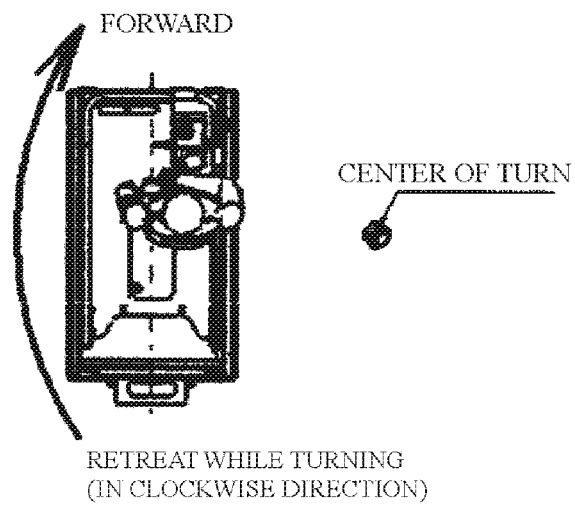
FIG. 10A is an explanatory view of the turn travel (right turn) of the aerial work platform, illustrating advance while turning in a clockwise direction.
Figure 10B:
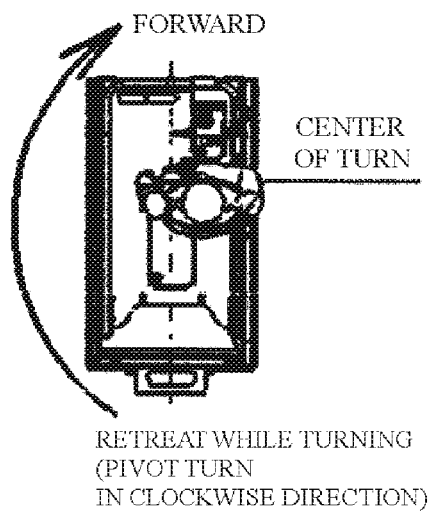
FIG. 10B is an explanatory view of the turn travel (right turn) of the aerial work platform, illustrating advance while turning in a clockwise direction.

Therefore, with the operation rod main body 21 inclined forward, when the operation rod main body 21 is tilted in the right direction from the neutral position, the travel state transitions from the state (not illustrated) in which the aerial work platform 1 advances in the straight-ahead direction to the state of the advance while turning in the clockwise direction as illustrated in FIG. 10A, and when the tilt angle reaches the maximum tilt angle) (20° in the right direction, the travel state transitions to the pivot turn in the clockwise direction as illustrated in FIG. 10B.

Figure 10C:
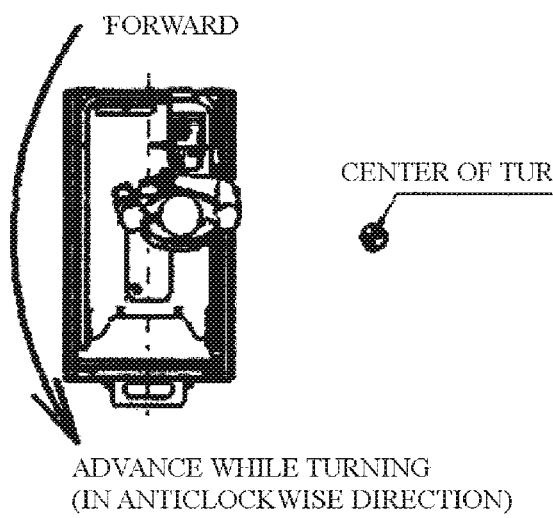
FIG. 10C is an explanatory view of the turn travel (right turn) of the aerial work platform, illustrating retreat while turning in an anticlockwise direction.
Figure 10D:
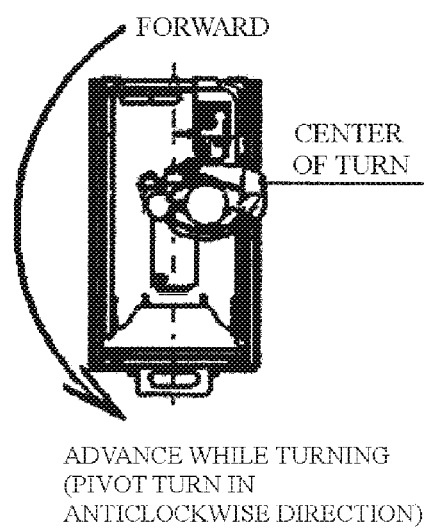
FIG. 10D is an explanatory view of the turn travel (right turn) of the aerial work platform, illustrating retreat while turning in an anticlockwise direction.

With the operation rod main body 21 inclined backward, when the operation rod main body 21 is tilted in the right direction from the neutral position, the travel state transitions from the state (not illustrated) in which the aerial work platform 1 retreats in the straight-ahead direction to the state of the retreat while turning in the anticlockwise direction as illustrated in FIG. 10C, and when the tilt angle reaches the maximum tilt angle) (20° in the left direction, the travel state transitions to the pivot turn in the anticlockwise direction as illustrated in FIG. 10D.

(3) Spin Turn Controller

The above-described spin turn controller 72 is means that starts when the controller 70 receives the switching command signal from the control panel 11. By the start of the spin turn controller 72, the controller 70 stops the above-described usual travel control, transitions to the spin turn control, rotates the left side motor 60*a* and the right side motor 60*b* in mutually opposite directions, and causes the aerial work platform 1 to perform the spin turn.

As described above, in this embodiment in which the changeover switch 24 as the three-position switch is disposed, the switching of the changeover switch 24 from the neutral position (OFF) to the first position or the second position starts the spin turn controller, the usual travel control in accordance with the correction value illustrated in FIG. 8 is stopped, and the spin turn control starts.

In the control by the spin turn controller 72, when the changeover switch 24 is switched from the neutral position (OFF) to the first position (left: ON) illustrated in the enlarged view in FIG. 5, regardless of the tilt angle in the right-left direction of the operation rod main body 21, the right side motor 60*b* is rotated at 100% of the above-described basic rotation speed, and as the rotation speed of the left side motor 60*a*, the rotation speed of −100% of the basic rotation speed (the reverse rotation) is applied to cause the aerial work platform 1 to perform the spin turn.

Meanwhile, when the above-described changeover switch 24 is switched to the second position (right: ON) illustrated in the enlarged view in FIG. 5, regardless of the tilt angle in the right-left direction of the operation rod main body 21, the spin turn controller 72 rotates the left side motor 60*a* at 100% of the above-described basic rotation speed, and applies the rotation speed −100% of the basic rotation speed (the reverse rotation) as the rotation speed of the right side motor 60*b* to cause the aerial work platform 1 to perform the spin turn.

Figure 11A:
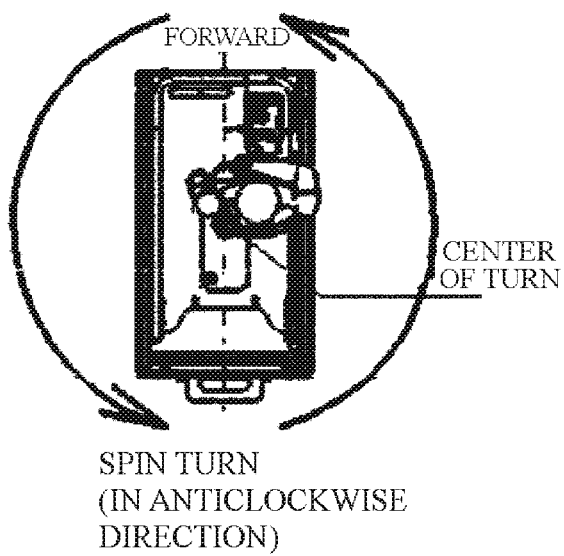
FIG. 11A is explanatory view of spin turn of the aerial work platform, illustrating the spin turn in an anticlockwise direction.

As a result, with the changeover switch 24 switched to the first position (left: ON), when the operation rod main body 21 is inclined forward, or with the operation rod main body 21 inclined forward, when the changeover switch 24 is switched to the first position (left: ON), as illustrated in FIG. 11A, the aerial work platform 1 performs the spin turn in the anticlockwise direction in plan view, and the turning speed by the spin turn increases due to an increase in the front inclination angle of the operation rod main body 21.

Figure 11B:
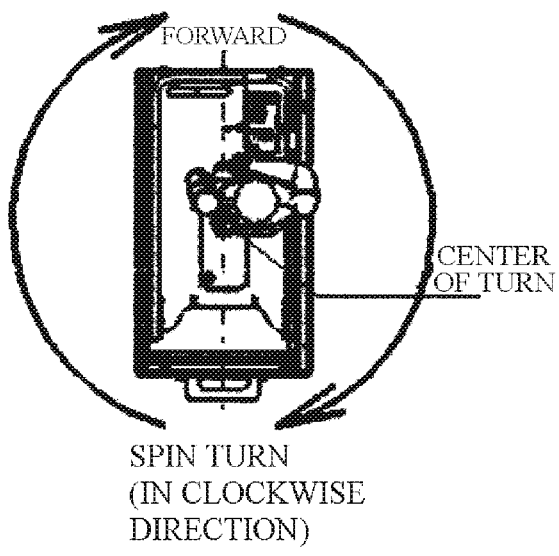
FIG. 11B is an explanatory view of spin turn of the aerial work platform, illustrating the spin turn in a clockwise direction.

With the changeover switch 24 switched to the second position (right: ON), when the operation rod main body 21 is inclined forward, or with the operation rod main body 21 inclined forward, when the changeover switch 24 is switched to the second position (right: ON), as illustrated in FIG. 11B, the aerial work platform 1 performs the spin turn in the clockwise direction in plan view, and the turning speed by the spin turn increases due to an increase in the front inclination angle of the operation rod main body 21.

Further, with the changeover switch 24 switched to the first position (left: ON), when the operation rod main body 21 is inclined backward, or with the operation rod main body 21 inclined backward, when the changeover switch 24 is switched to the first position (left: ON), as illustrated in FIG. 11B, the aerial work platform 1 performs the spin turn in the clockwise direction in plan view, and the turning speed by the spin turn increases due to an increase in the rear inclination angle of the operation rod main body 21.

With the changeover switch 24 switched to the second position (right: ON), when the operation rod main body 21 is inclined backward, or with the operation rod main body 21 inclined backward, when the changeover switch 24 is switched to the second position (right: ON), as illustrated in FIG. 11A, the aerial work platform 1 performs the spin turn in the anticlockwise direction in plan view, and the turning speed by the spin turn increases due to an increase in the rear inclination angle of the operation rod main body 21.

[Modifications]

In the embodiments described above, the changeover switch 24 is disposed on the operation rod 20, and the usual travel control and the spin turn control can be switched by the operation of the changeover switch 24.

In contrast to this, in this embodiment, an example in which the detection signal of the second tilt angle detection sensor 28b that detects the tilt of the operation rod main body 21 in the right-left direction by a predetermined angle (one example, 15°) or more is used as the switching command signal will be described.

In the example, the changeover switch denoted by reference numeral 24 in FIG. 3 to FIG. 5 need not be disposed.

In this embodiment as well, the point that the operation rod main body 21 is tiltable by 20° (40° in total) for each back and forth from the neutral position, and the predetermined basic rotation speed illustrated in FIG. 7 is applied according to the tilt angle in the front-rear direction is similar to the above-described embodiment in which the operation of the changeover switch 24 allows the switching between the usual travel control and the spin turn control.

In this embodiment, among the tilt ranges in the right-left direction of the operation rod main body 21 of 20° to each of the right and the left and 40° in total, a range less than 15° to the right and the left is the applied range for the usual travel control and the range 15° or more is the applied range for the spin turn control.

Figure 12:
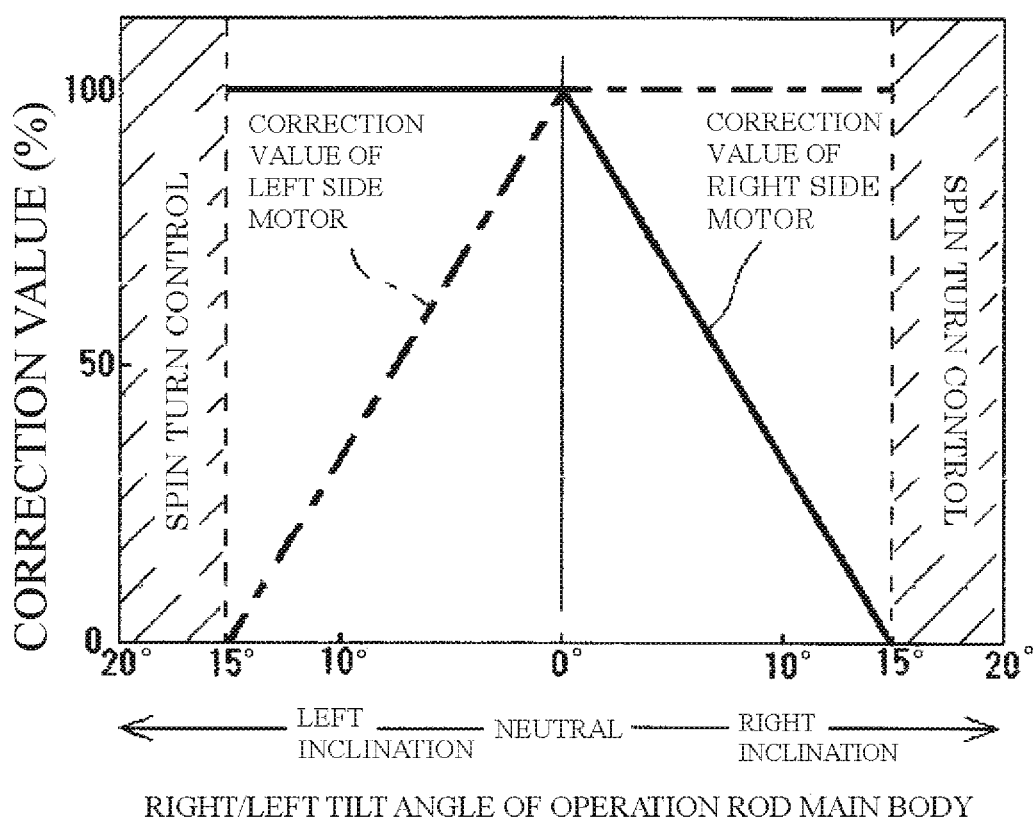
FIG. 12 is an explanatory view illustrating a modification of the correction value.

Therefore, in this embodiment, as illustrated in FIG. 12, in the case where the operation rod main body 21 is tilted to the left side, with the rotation speed of the right side motor 60b maintained at 100% of the above-described basic rotation speed, as the rotation speed of the left side motor 60a, the rotation speed obtained by correction with the correction value applied during the usual travel control so as to decelerate the basic rotation speed from 100% to 0% in accordance with the increase in the tilt angle in the range from 0° to less than 15° as the use range for the usual travel control is applied. Thus, by slowing the rotation speed of the left side motor 60a relative to the rotation speed of the right side motor 60b, the aerial work platform 1 is turned to the left. Additionally, in accordance with the increase in the tilt angle in the left direction of the operation rod main body 21, the aerial work platform 1 is changed so as to turn in a further small space, and by the tilt at the maximum tilt angle (as one example, <15°) in the left direction used in the usual travel control, the rotation speed of the left side motor 60a is decelerated down to 0% of the basic rotation speed to stop, thus performing the pivot turn.

In the case where the operation rod main body 21 is tilted to the right side, with the rotation speed of the left side motor 60a maintained at 100% of the above-described basic rotation speed, as the rotation speed of the right side motor 60b, the rotation speed obtained by correction so as to decelerate the basic rotation speed from 100% to 0% in accordance with the increase in the tilt angle in the range from 0° to less than 15° as the use range for the usual travel control is applied. Thus, by slowing the rotation speed of the right side motor 60b relative to the rotation speed of the left side motor 60a, the aerial work platform 1 is turned to the right direction. Additionally, in accordance with the increase in the tilt angle in the right direction of the operation rod main body 21, the aerial work platform 1 is changed so as to turn in a further small space, and by the tilt at the maximum tilt angle (as one example, <15°) in the right direction used in the usual travel control, the rotation speed of the right side motor 60b is decelerated down to 0% of the basic rotation speed to stop, thus performing the pivot turn.

Meanwhile, when the tilt angle in the right-left direction of the operation rod main body 21 becomes 15° or more, the spin turn controller 72 starts, the usual travel control in accordance with the correction value illustrated in FIG. 12 is stopped, and the spin turn control is started.

In the control by the spin turn controller 72, when the operation rod main body 21 is tilted in the left direction by 15° or more, regardless of the change in the tilt angle in the left direction of the operation rod main body 21 (the change between 15° to 20°), the right side motor 60b is rotated at 100% of the above-described basic rotation speed, and as the rotation speed of the left side motor 60a, the rotation speed of −100% of the basic rotation speed (the reverse rotation) is applied to cause the aerial work platform 1 to perform the spin turn.

Meanwhile, when the operation rod main body 21 is tilted in the right direction by 15° or more, regardless of the change in the tilt angle in the right direction of the operation rod main body 21 (the change between 15° to 20°), the left side motor 60a is rotated at 100% of the above-described basic rotation speed, and as the rotation speed of the right side motor 60b, the rotation speed of −100% of the basic rotation speed (the reverse rotation) is applied to cause the aerial work platform 1 to perform the spin turn.

As a result, when the operation rod main body 21 is inclined forward with the operation rod main body 21 tilted in the left direction by 15° or more or the operation rod main body 21 is tilted in the left direction by 15° or more with the operation rod main body 21 inclined forward, as illustrated in FIG. 11A, the aerial work platform 1 performs the spin turn in the anticlockwise direction in plan view, and the turning speed by the spin turn increases due to an increase in the front inclination angle of the operation rod main body 21.

When the operation rod main body 21 is inclined forward with the operation rod main body 21 tilted in the right direction by 15° or more or the operation rod main body 21 is tilted in the right direction by 15° or more with the operation rod main body 21 inclined forward, as illustrated in FIG. 11B, the aerial work platform 1 performs the spin turn in the clockwise direction in plan view, and the turning speed by the spin turn increases due to an increase in the front inclination angle of the operation rod main body 21.

Further, when the operation rod main body 21 is inclined backward with the operation rod main body 21 tilted in the left direction by 15° or more or the operation rod main body 21 is tilted in the left direction by 15° or more with the operation rod main body 21 inclined backward, as illustrated in FIG. 11B, the aerial work platform 1 performs the spin turn in the clockwise direction in plan view, and the turning speed by the spin turn increases due to an increase in the rear inclination angle of the operation rod main body 21.

Further, when the operation rod main body 21 is inclined backward with the operation rod main body 21 tilted in the right direction by 15° or more or the operation rod main body 21 is tilted in the right direction by 15° or more with the operation rod main body 21 inclined backward, as illustrated in FIG. 11A, the aerial work platform 1 performs the spin turn in the anticlockwise direction in plan view, and the turning speed by the spin turn increases due to an increase in the rear inclination angle of the operation rod main body 21.

As described above, when the tilt angle in the right-left direction of the operation rod main body 21 in the state of the spin turn control performed by tilting the operation rod main body 21 in the right-left direction by 15° or more is moved to a range less than 15°, the controller 70 terminates the spin turn control and returns the control to the above-described usual travel control.

[Operation of Traveling Operation Device]

The operation description of the traveling operation device described above will be described with reference to the flowcharts illustrated in FIG. 13 and FIG. 14.

Since the traveling operation device 10 of the present invention differs in the operation between the configuration in which the usual travel control and the spin turn control are switched by the operation of the changeover switch 24 and the configuration in which the usual travel control and the spin turn control are switched by tilting the operation rod main body 21 in the right-left direction by the predetermined angle (15°) or more, the respective operations will be described separately.

(1) Example of Switching with Changeover Switch

Figure 13:
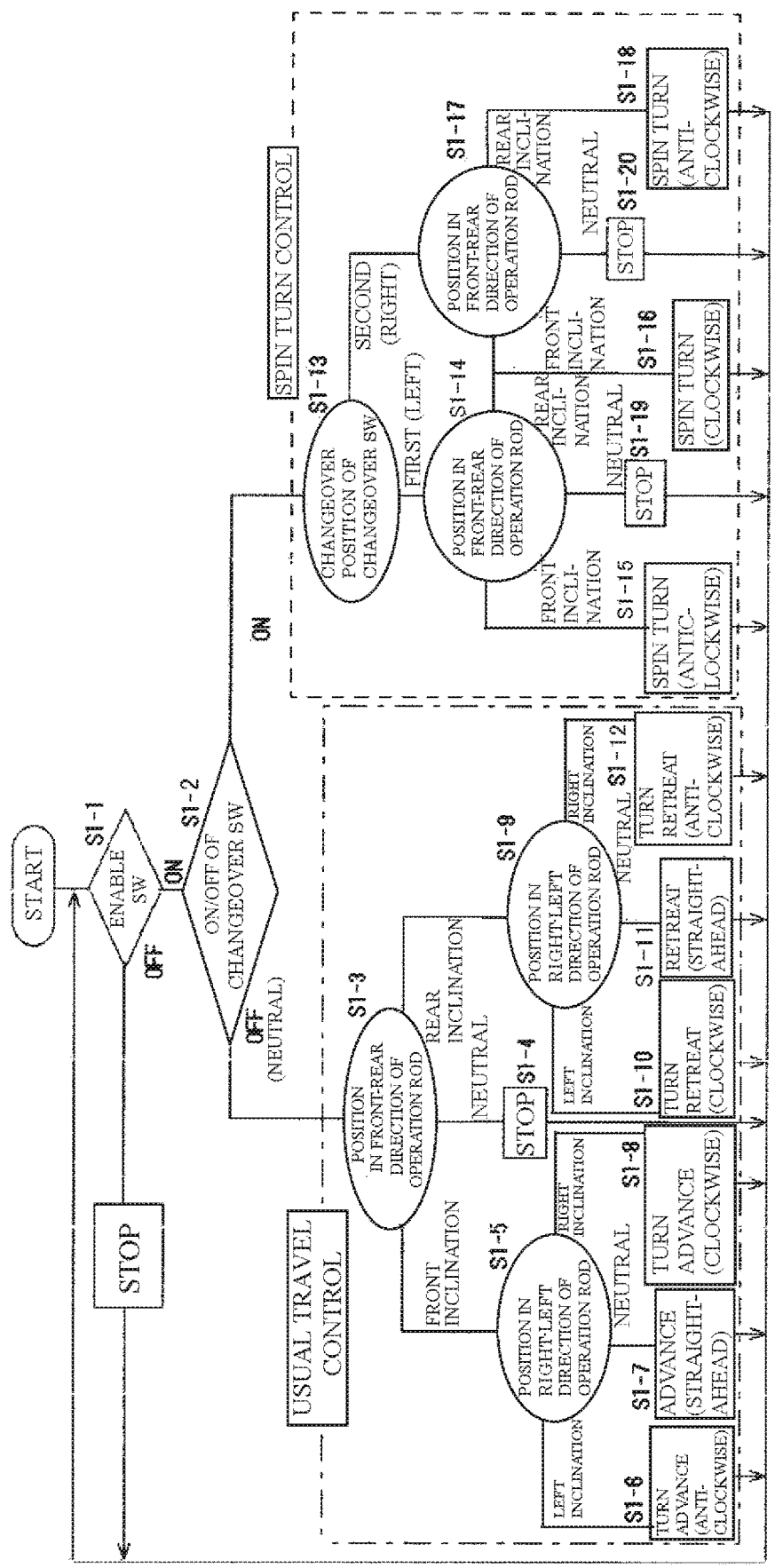
FIG. 13 is an operational flow of the aerial work platform including the traveling operation device according to an embodiment of the present invention.

FIG. 13 illustrates the operation of the traveling operation device 10 that performs the switching between the usual travel control and the spin turn control by the operation of the changeover switch 24.

When the operator grips the enable switch 22 together with the grip portion 26 of the operation rod 20 from a state in which the enable switch 22 disposed on the operation rod 20 is OFF and the aerial work platform 1 stops, the enable switch 22 turns ON and ("ON" in S1-1), and the travel operation by the tilt operation of the operation rod main body 21 and the operation of the changeover switch 24 are enabled.

With the enable switch ON, the controller 70 determines the presence/absence of the switching command signal (the ON signal) from the changeover switch 24. With the changeover switch 24 OFF ("OFF (neutral)" in S1-2), the usual travel controller 71 is started to perform the usual travel control, and with the changeover switch 24 ON ("ON" in S1-2), the spin turn controller 72 is started to perform the spin turn control.

In the usual travel control, the usual travel controller 71 in the controller 70 performs the following control based on whether the tilt position in the front-rear direction of the operation rod main body 21 is any of the positions of front inclination, neutral, and rear inclination.

When the tilt position in the front-rear direction of the operation rod main body 21 is at the neutral position ("neutral" in S1-3), as illustrated in FIG. 7, the basic rotation speed "0" is applied to the left side motor 60a, and the right side motor 60b and the aerial work platform 1 maintains the stop state (S1-4).

When the operation rod main body 21 is at the front inclination position ("front inclination" in S1-3), whether the tilt position in the right-left direction of the operation rod main body 21 is any of the positions of the left inclination, neutral, and right inclination is further determined (S1-5), and the controller 70 causes the aerial work platform 1 to perform the following advance operation based on the determination result.

That is, when the tilt position in the right-left direction of the operation rod main body 21 is at the left inclination position ("left inclination" in S1-5), while the controller 70 maintains the rotation speed of the right side motor 60b at 100% of the basic rotation speed in accordance with the correction value in FIG. 8, the controller 70 applies the rotation speed obtained by decelerating the basic rotation speed with the predetermined correction value according to the left tilt angle of the operation rod main body 21 as the rotation speed of the left side motor 60a. Accordingly, the rotation speed of the left side motor 60a is set to be lower than the rotation speed of the right side motor 60b, and thus, as illustrated in FIG. 9A and FIG. 9B, the aerial work platform 1 is advanced while turned in the anticlockwise direction (S1-6).

When the tilt position in the right-left direction of the operation rod main body 21 is at the neutral position ("neutral" in S1-5), the controller 70 applies the basic rotation speed illustrated in FIG. 7 to both of the left side motor 60a and the right side motor 60b to advance the aerial work platform 1 in the straight-ahead direction (S1-7).

Further, when the tilt position in the right-left direction of the operation rod main body 21 is at the right inclination position ("right inclination" in S1-5), while the controller 70 maintains the rotation speed of the left side motor 60a at 100% of the basic rotation speed in accordance with the correction value in FIG. 8, the controller 70 applies the rotation speed obtained by decelerating the basic rotation speed with the predetermined correction value according to the right tilt angle of the operation rod main body 21 as the rotation speed of the right side motor 60b. Accordingly, the rotation speed of the right side motor 60b is set to be lower than the rotation speed of the left side motor 60a, and thus, as illustrated in FIG. 10A and FIG. 10B, the aerial work platform 1 is advanced while turned in the clockwise direction (S1-8).

When the operation rod main body 21 is at the rear inclination position ("rear inclination" in S1-3), whether the tilt position in the right-left direction of the operation rod main body 21 is any of the positions of the left inclination, neutral, and right inclination is determined (S1-9), and the controller 70 causes the aerial work platform 1 to perform the following retreat operation based on the determination result.

That is, when the tilt position in the right-left direction of the operation rod main body 21 is at the left inclination position ("left inclination" in S1-9), while the controller 70 maintains the rotation speed of the right side motor 60b at 100% of the basic rotation speed in accordance with the correction value in FIG. 8, the controller 70 applies the rotation speed obtained by decelerating the basic rotation speed with the predetermined correction value according to the left tilt angle of the operation rod main body 21 as the rotation speed of the left side motor 60a. Accordingly, the rotation speed of the left side motor 60a is set to be lower than the rotation speed of the right side motor 60b, and thus, as illustrated in FIG. 9C and FIG. 9D, the aerial work platform 1 is retreated while turned in the clockwise direction (S1-10).

When the tilt position in the right-left direction of the operation rod main body 21 is at the neutral position ("neutral" in S1-9), the controller 70 applies the basic rotation speed illustrated in FIG. 7 to both of the left side motor 60a and the right side motor 60b to retreat the aerial work platform 1 in the straight-ahead direction (S1-11).

Further, when the tilt position in the right-left direction of the operation rod main body 21 is at the right inclination position ("right inclination" in S1-9), while the controller 70 maintains the rotation speed of the left side motor 60a at 100% of the basic rotation speed in accordance with the correction value in FIG. 8, the controller 70 applies the rotation speed obtained by decelerating the basic rotation speed with the predetermined correction value according to the right tilt angle of the operation rod main body 21 as the rotation speed of the right side motor 60b. Accordingly, the rotation speed of the right side motor 60b is set to be lower than the rotation speed of the left side motor 60a, and thus, as illustrated in FIG. 10C and FIG. 10D, the aerial work platform 1 is retreated while turned in the anticlockwise direction (S1-12).

Meanwhile, in the spin turn control with the changeover switch 24 ON ("ON" in S1-2), whether the changeover switch 24 is switched to any of the positions of the first position (left) and the second position (right) is determined (S1-13), and the operation is performed as follows.

With the position of the changeover switch 24 at the first position (left: ON) ("first (left)" in S1-13), regardless of the tilt position in the right-left direction of the operation rod main body 21, while the controller 70 applies the rotation speed of 100% of the basic rotation speed as the rotation speed of the right side motor 60b, the rotation speed of −100% of the basic rotation speed is applied as the rotation speed of the left side motor 60a, and the left side motor 60a is caused to perform the reverse rotation with respect to the right side motor 60b at the identical rotation speed to cause the aerial work platform 1 to perform the spin turn.

Therefore, with the operation rod main body 21 at the front inclination position ("front inclination" in S1-14), as illustrated in FIG. 11A, the aerial work platform 1 performs the spin turn in the anticlockwise direction (S1-15). With the operation rod main body 21 at the rear inclination position ("rear inclination" in S1-14), as illustrated in FIG. 11B, the aerial work platform 1 performs the spin turn in the clockwise direction (S1-16).

With the position of the changeover switch 24 at the second position (right: ON) ("second (right)" in S1-13), regardless of the tilt position in the right-left direction of the operation rod main body 21, while the controller 70 applies the rotation speed of 100% of the basic rotation speed as the rotation speed of the left side motor 60a, the rotation speed of −100% of the basic rotation speed is applied as the rotation speed of the right side motor 60b, and the right side motor 60b is caused to perform the reverse rotation with respect to the left side motor 60a at the identical rotation speed to cause the aerial work platform 1 to perform the spin turn.

Therefore, with the operation rod main body 21 at the front inclination position ("front inclination" in S1-17), as illustrated in FIG. 11B, the aerial work platform 1 performs the spin turn in the clockwise direction (S1-16). With the operation rod main body 21 at the rear inclination position ("rear inclination" in S1-17), as illustrated in FIG. 11A, the aerial work platform 1 performs the spin turn in the anticlockwise direction (S1-18).

Even when the changeover switch 24 is at any of the positions of the first position and the second position, the controller 70 receives the switching command signal, and the spin turn controller 72 starts, in the case where the tilt position in the front-rear direction of the operation rod main body 21 is at the neutral position ("neutral" in S1-14 and S1-17), the aerial work platform 1 does not perform the spin turn but stops (S1-19, S1-20).

(2) Example of Switching by Tilt Angle of Operation Rod Main Body

As described above, in the description with reference to FIG. 13, the operation when the switching between the usual travel control and the spin turn control is performed by the operation of the changeover switch 24 has been described.

Figure 14:
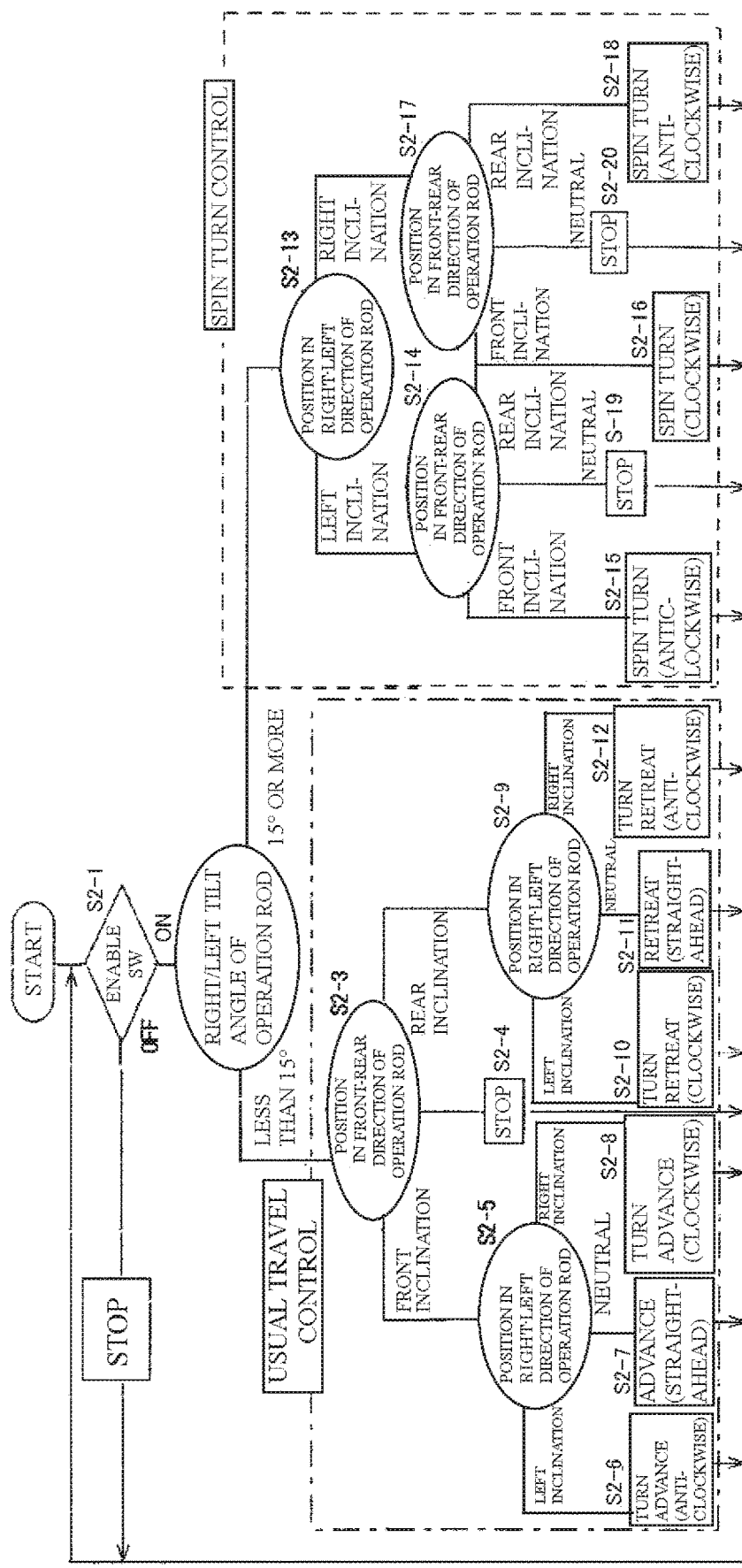
FIG. 14 is an operational flow of a aerial work platform including a traveling operation device according to another embodiment of the present invention.
Figure 15:
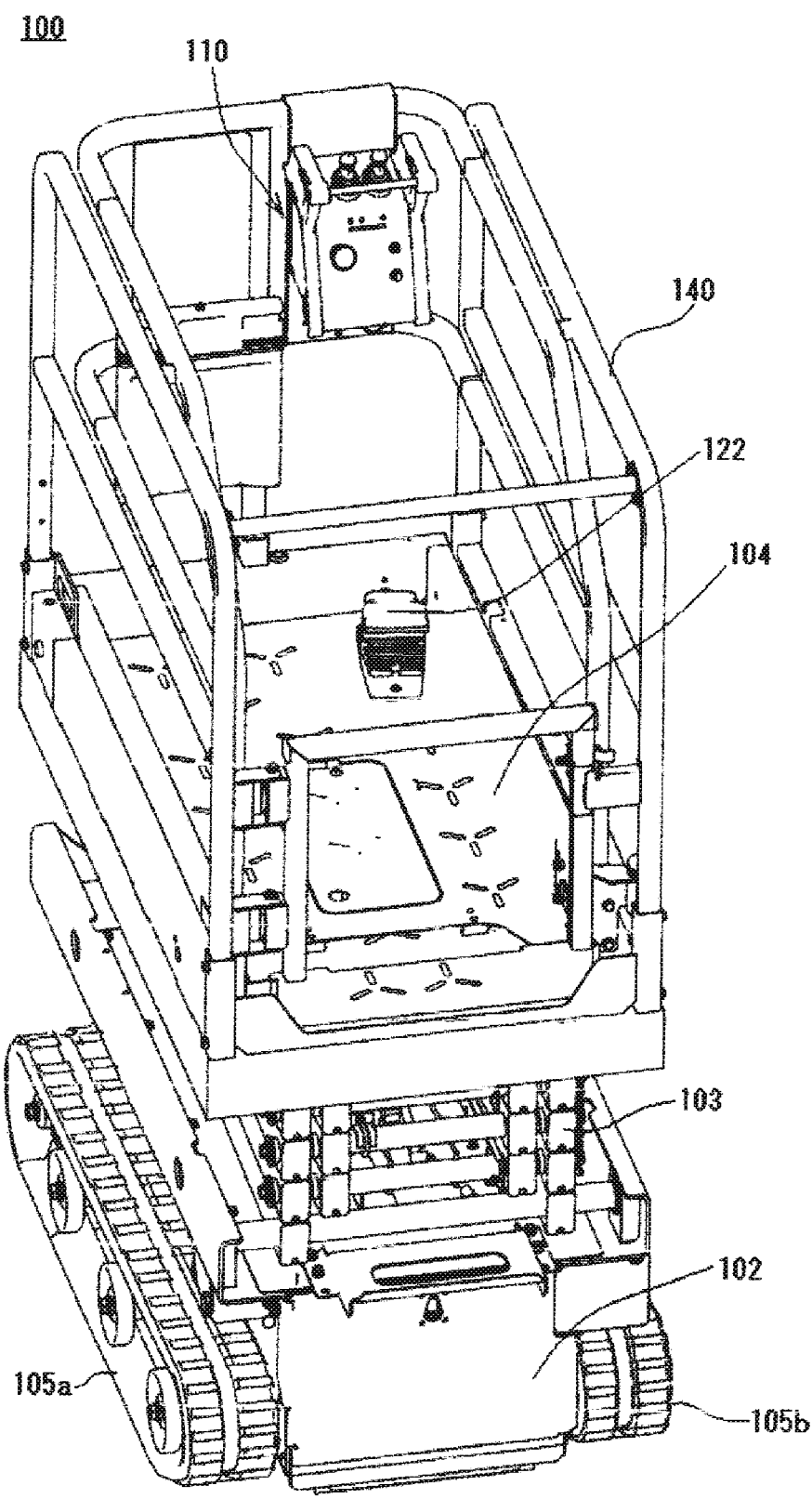
FIG. 15 is a perspective view of a conventional crawler-type aerial work platform.
Figure 16:
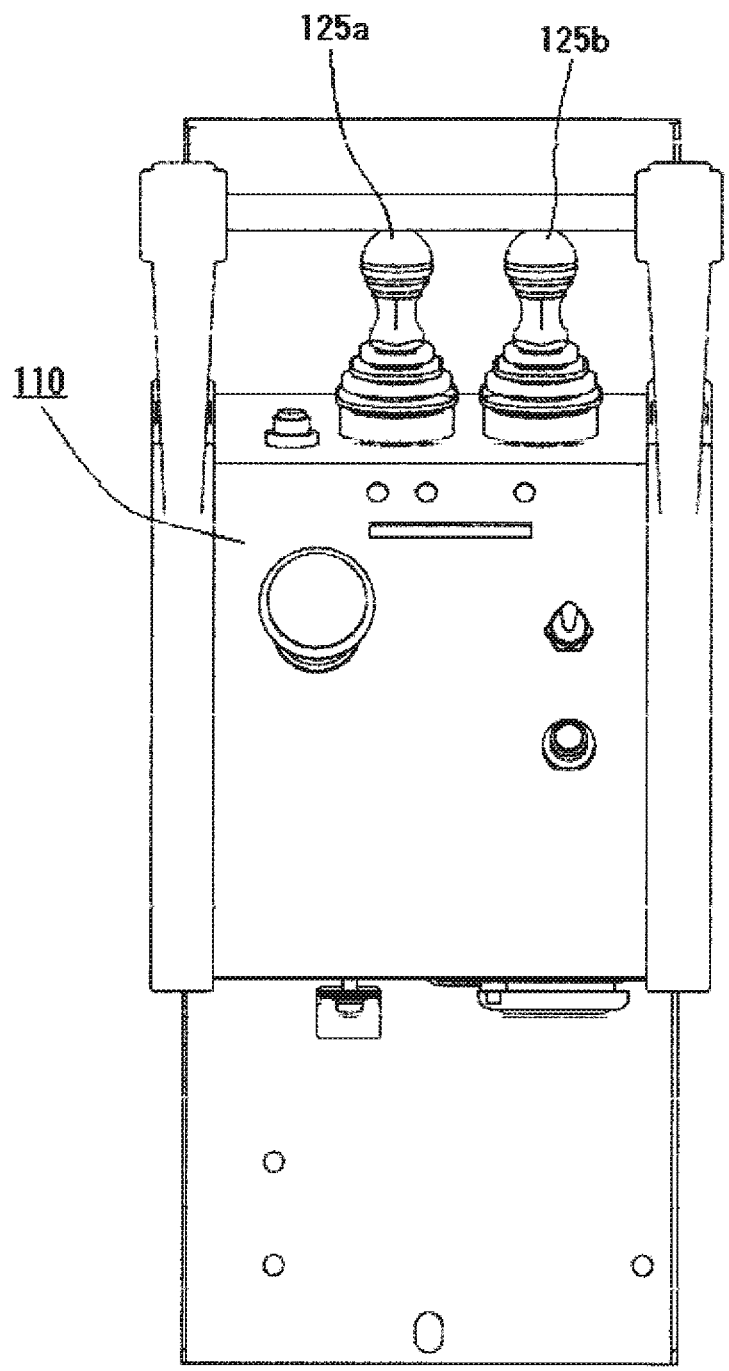
FIG. 16 is an explanatory view of a conventional drive operating device.
Figure 17:
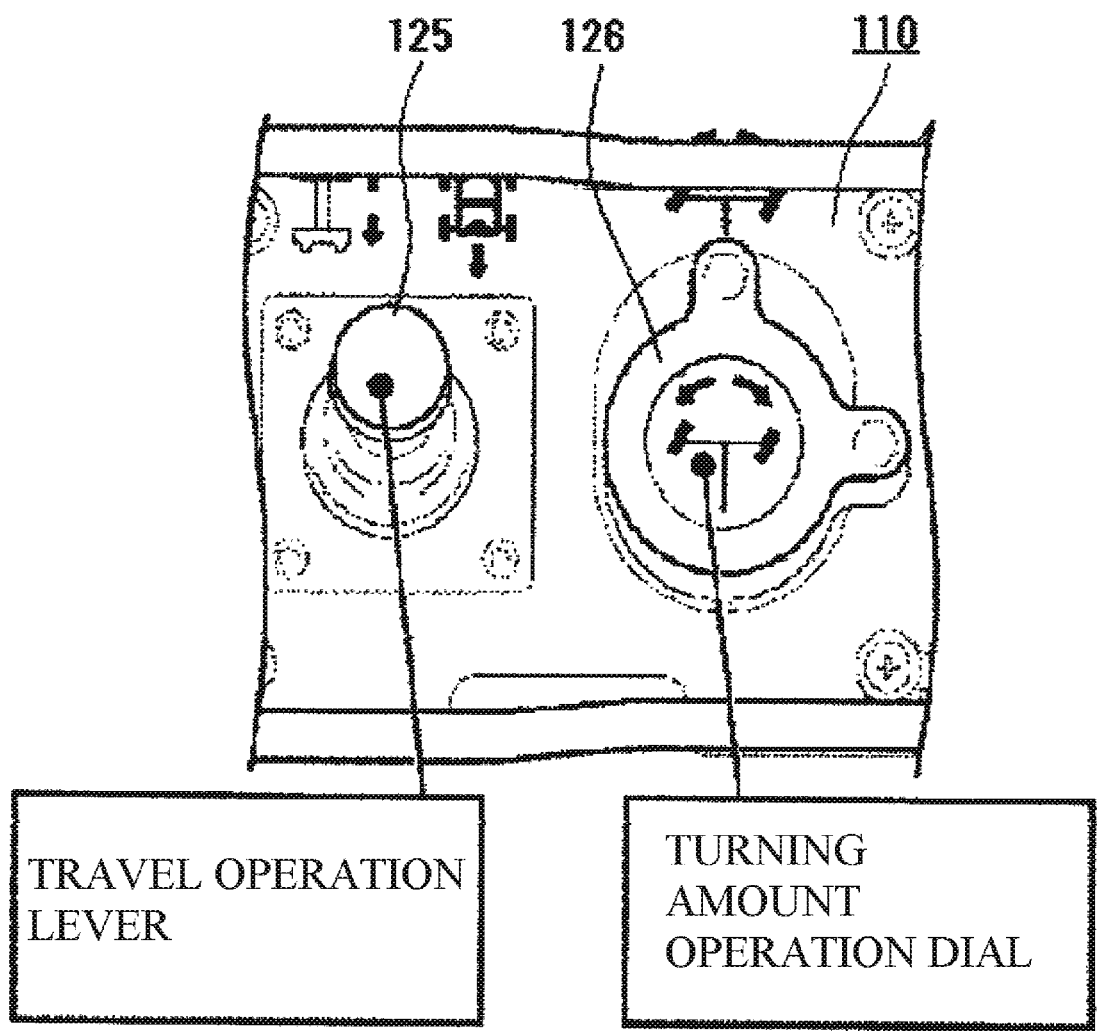
FIG. 17 is an explanatory view of a conventional drive operating device (corresponds to the configuration in FIG. 3 in Japanese Patent No. 6080458).

In contrast to this, FIG. 14 illustrates the operation of the traveling operation device 10 configured such that the usual travel control is performed when the tilt angle in the right-left direction of the operation rod main body 21 is in the range of less than 15°, and the spin turn control is performed when the tilt angle in the right-left direction of the operation rod main body 21 is 15° or more.

As illustrated in FIG. 14, the grip portion 26 of the operation rod 20 disposed on the control panel 11 is gripped together with the enable switch 22 from a state of "start" in which the aerial work platform 1 stops, the enable switch 22 turns ON ("ON" in S2-1), and the travel operation by the tilt operation of the operation rod main body 21 is enabled.

The controller 70 that has started receiving the signal from the operation rod 20 by turning ON the enable switch 22 determines whether the operation rod main body 21 is in a state of being tilted to the left side or the right side by 15° or more (S2-2). When the tilt angle is less than 15° ("less than 15°" in S2-2), the controller 70 starts the usual travel controller 71 and performs the usual travel control. Meanwhile, in the case of the tilt angle being 15° or more, the controller 70 starts the spin turn controller 72, aborts the usual travel control, and starts the spin turn control.

In the usual travel control, the usual travel controller 71 in the controller 70 performs the following control based on whether the tilt position in the front-rear direction of the operation rod main body 21 is any of the positions of front inclination, neutral, and rear inclination.

When the operation rod main body 21 is at the neutral position ("neutral" in S2-3), the basic rotation speed "0" illustrated in FIG. 7 is applied to the left side motor 60a and the right side motor 60b and the aerial work platform 1 maintains the stop state (S2-4).

When the operation rod main body 21 is at the front inclination position ("front inclination" in S2-3), whether the tilt position in the right-left direction of the operation rod main body 21 is any of the positions of the left inclination, neutral, and right inclination is further determined (S2-5), and the controller 70 causes the aerial work platform 1 to perform the following advance operation based on the determination result.

That is, when the tilt position in the right-left direction of the operation rod main body 21 is at the left inclination position ("left inclination" in S2-5), while the controller 70 maintains the rotation speed of the right side motor 60b at 100% of the basic rotation speed in accordance with the correction value in FIG. 12, the controller 70 applies the rotation speed obtained by decelerating the basic rotation speed with the predetermined correction value according to the left tilt angle of the operation rod main body 21 as the rotation speed of the left side motor 60a. Accordingly, the rotation speed of the left side motor 60a is set to be lower than the rotation speed of the right side motor 60b, and thus as illustrated in FIG. 9A and FIG. 9B, the aerial work platform 1 is advanced while turned in the anticlockwise direction (S2-6).

When the tilt position in the right-left direction of the operation rod main body 21 is at the neutral position ("neutral" in S2-5), the controller 70 applies the basic rotation speed illustrated in FIG. 7 to both of the left side motor 60*a* and the right side motor 60*b* to advance the aerial work platform 1 in the straight-ahead direction (S2-7).

Further, when the tilt position in the right-left direction of the operation rod main body 21 is at the right inclination position ("right inclination" in S2-5), while the controller 70 maintains the rotation speed of the left side motor 60*a* at 100% of the basic rotation speed in accordance with the correction value in FIG. 12, the controller 70 applies the rotation speed obtained by decelerating the basic rotation speed with the predetermined correction value according to the right tilt angle of the operation rod main body 21 as the rotation speed of the right side motor 60*b*. Accordingly, the rotation speed of the right side motor 60*b* is set to be lower than the rotation speed of the left side motor 60*a*, and thus, as illustrated in FIG. 10A and FIG. 10B, the aerial work platform 1 is advanced while turned in the clockwise direction (S2-8).

When the operation rod main body 21 is at the rear inclination position ("rear inclination" in S2-3), whether the tilt position in the right-left direction of the operation rod main body 21 is any of the positions of the left inclination, neutral, and right inclination is determined (S2-9), and the controller 70 causes the aerial work platform 1 to perform the following retreat operation based on the determination result.

That is, when the tilt position in the right-left direction of the operation rod main body 21 is at the left inclination position ("left inclination" in S2-9), while the controller 70 maintains the rotation speed of the right side motor 60*b* at 100% of the basic rotation speed in accordance with the correction value in FIG. 12, the controller 70 applies the rotation speed obtained by decelerating the basic rotation speed with the predetermined correction value according to the left tilt angle of the operation rod main body 21 as the rotation speed of the left side motor 60*a*. Accordingly, the rotation speed of the left side motor 60*a* is set to be lower than the rotation speed of the right side motor 60*b*, and thus, as illustrated in FIG. 9C and FIG. 9D, the aerial work platform 1 is retreated while turned in the clockwise direction (S2-10).

When the tilt position in the right-left direction of the operation rod main body 21 is at the neutral position ("neutral" in S2-9), the controller 70 applies the basic rotation speed illustrated in FIG. 7 to both of the left side motor 60*a* and the right side motor 60*b* to retreat the aerial work platform 1 in the straight-ahead direction (S2-11).

Further, when the tilt position in the right-left direction of the operation rod main body 21 is at the right inclination position ("right inclination" in S2-9), while the controller 70 maintains the rotation speed of the left side motor 60*a* at 100% of the basic rotation speed in accordance with the correction value in FIG. 12, the controller 70 applies the rotation speed obtained by decelerating the basic rotation speed with the predetermined correction value according to the right tilt angle of the operation rod main body 21 as the rotation speed of the right side motor 60*b*. Accordingly, the rotation speed of the right side motor 60*b* is set to be lower than the rotation speed of the left side motor 60*a*, and thus, as illustrated in FIG. 10C and FIG. 10D, the aerial work platform 1 is retreated while turned in the anticlockwise direction (S2-12).

Meanwhile, in the spin turn control ("15° or more" in S2-2) that tilts the operation rod main body 21 in the left or right direction by 15° or more, whether the operation rod main body 21 is in the state of being tilted in the left direction by 15° or more or in the state of being tilted in the right direction by 15° or more is determined (S2-13), and the operation is performed as follows.

When the operation rod main body 21 is tilted in the left direction by 15° or more ("left inclination" in S2-13), regardless of whether the tilt angle in the left direction of the operation rod main body 21 at any position of from 15 to 20°, while the controller 70 applies the rotation speed of 100% of the basic rotation speed as the rotation speed of the right side motor 60*b*, the rotation speed of −100% of the basic rotation speed is applied as the rotation speed of the left side motor 60*a*, and the left side motor 60*a* is caused to perform the reverse rotation with respect to the right side motor 60*b* at the identical rotation speed to cause the aerial work platform 1 to perform the spin turn.

Therefore, with the operation rod main body 21 at the front inclination position ("front inclination" in S2-14), as illustrated in FIG. 11A, the aerial work platform 1 is caused to perform the spin turn in the anticlockwise direction (S2-15). With the operation rod main body 21 at the rear inclination position ("rear inclination" in S2-14), as illustrated in FIG. 11B, the aerial work platform 1 is caused to perform the spin turn in the clockwise direction (S2-16).

When the operation rod main body 21 is tilted in the right direction by 15° or more ("right inclination" in S2-13), regardless of whether the tilt angle in the right direction of the operation rod main body 21 at any position of from 15 to 20°, while the controller 70 applies the rotation speed of 100% of the basic rotation speed as the rotation speed of the left side motor 60*a*, the rotation speed of −100% of the basic rotation speed is applied as the rotation speed of the right side motor 60*b*, and the right side motor 60*b* is caused to perform the reverse rotation with respect to the left side motor 60*a* at the identical rotation speed to cause the aerial work platform 1 to perform the spin turn.

Therefore, with the operation rod main body 21 at the front inclination position ("front inclination" in S2-17), as illustrated in FIG. 11B, the aerial work platform 1 performs the spin turn in the clockwise direction (S2-16). With the operation rod main body 21 at the rear inclination position ("rear inclination" in S2-17), as illustrated in FIG. 11A, the aerial work platform 1 performs the spin turn in the anti-clockwise direction (S2-18).

Even when the operation rod main body 21 is tilted to the left or the right by 15° or more, the controller 70 receives the switching command signal, and the spin turn controller 72 starts, in the case where the tilt position in the front-rear direction of the operation rod main body 21 is at the neutral position ("neutral" in S2-14 and S2-17), the aerial work platform 1 does not perform the spin turn but stops (S2-19, S2-20).

DESCRIPTION OF REFERENCE NUMERALS

1 Aerial work platform
2 Undercarriage
3 Elevating mechanism (scissors link mechanism)
4 Deck
5 Crawler
5*a* Left side crawler 5b Right side crawler
10 Traveling operation device
11 Control panel
12 Control panel main body
13 Casing
20 Operation rod
21 Operation rod main body
22 Enable switch
24 Changeover switch
26 Grip portion
28a First tilt angle detection sensor (back/forth tilt angle detector)
28b Second tilt angle detection sensor (right/left tilt angle detector)
29 Attachment/removal detector
30 Bracket
31 Back surface plate
31a Perpendicular direction on one side in the width direction (of the back surface plate)
31b Upper end side (of the back surface plate)
32 Side surface plate
32a One side in a height direction (of the side surface plate)
32b Upper end side (of the side surface plate)
3+3 Front surface plate
33a One side in the width direction (of the front surface plate)
33b Upper end side (of the front surface plate)
34 Suspension metal fitting
34a Suspension piece
34b Lock piece
34c Collar portion
40 Safety barrier
50 Emergency stop switch
60a Left side motor
60b Right side motor
70 Controller
71 Usual travel controller
72 Spin turn controller
80 Cable
100 Aerial work platform
102 Undercarriage
103 Elevating mechanism (scissors link mechanism)
104 Deck
105a Left side crawler
105b Right side crawler
110 Control panel
125 Travel operation lever
126 Turning amount operation dial
140 Safety barrier

What is claimed is:

1. A traveling operation device of self-propelled crawler-type aerial work platform, comprising:
a left side crawler and a right side crawler as traveling devices;
an undercarriage including a left side motor and a right side motor, the left side motor and the right side motor independently driving the left side crawler and the right side crawler, respectively; and
a deck configured to move up and down above the undercarriage, wherein
the traveling operation device includes:
a control panel disposed on the deck;
an operation rod disposed on the control panel; and
a controller that controls rotations of the left side motor and the right side motor according to an operation of the operation rod,
the operation rod includes:
an operation rod main body capable of tilt operation from a neutral position in a front-rear direction and a right-left direction;
an enable switch that enables the control of the left side and the right side motors by the controller based on the operation of the operation rod only while the enable switch is pressed, and
a changeover switch generating a switching command signal,
the enable switch is disposed at a position where the tilt is operable on the operation rod main body while the enable switch is pressed with fingers same as fingers gripping the operation rod main body on the operation rod main body, and
the changeover switch is disposed at a position where the changeover switch is simultaneously operable with the enable switch by the fingers same as the fingers gripping the operation rod main body while the operation rod main body is gripped and the tilt operation is performed,
the controller:
performs usual travel control when the switching command signal is not received from the operation rod; and
stops the usual travel control when the switching command signal is received to transition to spin turn control,
in the usual travel control:
when the tilt operation is performed on the operation rod main body only in the front-rear direction without the tilt operation in the right-left direction, the left side motor and the right side motor are caused to rotate at a basic rotation speed preset as a rotation direction and a rotation speed common to the left side motor and the right side motor corresponding to respective positions of neutral, front inclination, and rear inclination of the operation rod main body; and
when the tilt operation is performed on the operation rod main body in the right-left direction while the tilt operation is performed on the operation rod main body in the front-rear direction, the rotation speeds of the left side motor and the right side motor are corrected such that the crawler-type aerial work platform performs a turning operation in a direction corresponding to the tilt operation in the right-left direction of the operation rod main body, and
in the spin turn control, the left side motor and the right side motor are caused to rotate in mutually opposite directions.

2. The traveling operation device of crawler-type aerial work platform according to claim 1, wherein
the changeover switch has the neutral position, a first position, and a second position, a first switching command signal is generated at the first position as the switching command signal, and a second switching command signal is generated at the second position as the switching command signal, and
the controller:
upon receiving the first switching command signal from the changeover switch, rotates the right side motor at the basic rotation speed and the left side motor at a rotation speed in a reverse rotation direction of the basic rotation speed; and
upon receiving the second switching command signal from the changeover switch, rotates the left side motor at the basic rotation speed and the right side motor at a rotation speed in the reverse rotation direction of the basic rotation speed.

3. The traveling operation device of crawler-type aerial work platform according to claim 1, wherein
a detection signal that detects a tilt in the right-left direction of the operation rod main body by a predetermined angle or more with respect to the neutral position by right/left tilt angle detector configured to detect a tilt angle in the right-left direction of the operation rod main body is treated as the switching command signal.

4. The traveling operation device of crawler-type aerial work platform according to claim 3, wherein
the controller:
rotates the right side motor at the basic rotation speed and the left side motor at a rotation speed in a reverse rotation direction of the basic rotation speed when the detection signal from the right/left tilt angle detector indicates that a left tilt angle of the operation rod main body is the predetermined angle or more; and
rotates the left side motor at the basic rotation speed and the right side motor at a rotation speed in the reverse rotation direction of the basic rotation speed when the detection signal from the right/left tilt angle detector indicates that a right tilt angle of the operation rod main body is the predetermined angle or more.

5. The traveling operation device of crawler-type aerial work platform according to claim 1, wherein
in the usual travel control, the controller:
stops the rotation of the left side motor when the operation rod main body is at a maximum left tilt angle in the usual travel control; and
stops the rotation of the right side motor when the operation rod main body is at a maximum right tilt angle in the usual travel control.

6. The traveling operation device of crawler-type aerial work platform according to claim 3, wherein
in the usual travel control, the controller:
stops the rotation of the left side motor when the operation rod main body is at a maximum left tilt angle in the usual travel control; and
stops the rotation of the right side motor when the operation rod main body is at a maximum right tilt angle in the usual travel control.

7. The traveling operation device of crawler-type aerial work platform according to claim 3, wherein
in the usual travel control, the controller:
stops the rotation of the left side motor when the operation rod main body is at a maximum left tilt angle in the usual travel control; and
stops the rotation of the right side motor when the operation rod main body is at a maximum right tilt angle in the usual travel control.

8. The traveling operation device of crawler-type aerial work platform according to claim 1, wherein
in the usual travel control, the controller:
stops the rotation of the left side motor when the operation rod main body is at a maximum left tilt angle in the usual travel control; and
stops the rotation of the right side motor when the operation rod main body is at a maximum right tilt angle in the usual travel control.

* * * * *